United States Patent
Kupatt

(10) Patent No.: US 11,638,401 B2
(45) Date of Patent: May 2, 2023

(54) METHODS AND COMPOSITIONS FOR INCREASING TOLERANCE TO ABIOTIC STRESS IN PLANTS

(71) Applicant: CROP MICROCLIMATE MANAGEMENT INC., Wilmington, NC (US)

(72) Inventor: Charles Christian Kupatt, Wilmington, NC (US)

(73) Assignee: CROP MICROCLIMATE MANAGEMENT INC., Wilmington, NC (US)

( * ) Notice: Subject to any disclaimer, the term of this patent is extended or adjusted under 35 U.S.C. 154(b) by 94 days.

(21) Appl. No.: 16/967,015

(22) PCT Filed: Jan. 31, 2019

(86) PCT No.: PCT/US2019/016021
§ 371 (c)(1),
(2) Date: Aug. 3, 2020

(87) PCT Pub. No.: WO2019/152632
PCT Pub. Date: Aug. 8, 2019

(65) Prior Publication Data
US 2021/0037717 A1    Feb. 11, 2021

Related U.S. Application Data

(60) Provisional application No. 62/626,350, filed on Feb. 5, 2018.

(51) Int. Cl.
*A01G 7/06* (2006.01)
*A01N 37/10* (2006.01)

(52) U.S. Cl.
CPC .............. *A01G 7/06* (2013.01); *A01N 37/10* (2013.01)

(58) Field of Classification Search
CPC .......... A01G 7/06; A01N 37/10; A01N 37/04; A01N 47/44
See application file for complete search history.

(56) References Cited

U.S. PATENT DOCUMENTS

| 2011/0023281 | A1 | 2/2011 | Schraga | |
| 2014/0349849 | A1* | 11/2014 | Schulz | A01N 61/00 504/106 |
| 2017/0208800 | A1 | 7/2017 | Kupatt | |

FOREIGN PATENT DOCUMENTS

| DE | 4024260 | 2/1992 |
| WO | 2016034615 A1 | 3/2016 |

OTHER PUBLICATIONS

Riccardo Angelini, Alessandra Cona, Rodolfo Federico, Paola Fincato, Paraskevi Tavladoraki and AlessandraTisi, "Plant amine oxidases "on the move": An update", Plant Physiology and Biochemistry, 48 (2010), 560-564. (Year: 2010).*
Extended European Search Report corresponding to EP Application No. 19747440.6, dated Sep. 28, 2021, 9 pages.
International Search Report and Written Opinion corresponding to International Patent Application No. PCT/US2019/16021, dated May 10, 2019, 11 pages.
Leaf, G. "Crop Microclimate Management to patent powerful new stress relief technology" http://cropstress.com/assets/photon-cmm2017p_newsrelease_3-27-18.pdf Mar. 27, 2018, 2 pages.
Angelini et al. "Plant amine oxidases "on the move": An update" Plant Physiology Biochemistry, 48(7):560-564 2010 Abstract.
International Preliminary Report on Patentability and Notification corresponding to International Patent Application No. PCT/US2019/016021 dated Aug. 11, 2020, 9 pages.
Xing, Su Guo, et al., "Higher accumulation of y-aminobutyric acid induced by salt stress through stimulating the activity of diamine oxidases in *Glycine max* (L.) Merr. roots", Plant Physiology and Biochemistry 45, pp. 560-566 (2007).
Third Party Material corresponding to AU 2019216339; dated Aug. 11, 2022 (29 pages).
Third Party Material corresponding to AU 2019216339; dated Oct. 31, 2022 (11 pages).
Third Party Observations corresponding to EP 19747440.6; dated Nov. 4, 2022 (12 pages).
Third Party Opposing Brief corresponding to CL 2025-2020; dated Aug. 25, 2022 (102 pages).

* cited by examiner

*Primary Examiner* — Mina Haghighatian
*Assistant Examiner* — Nathan W Schlientz
(74) *Attorney, Agent, or Firm* — Myers Bigel, P.A.

(57) ABSTRACT

The present invention relates to compositions and methods for increasing tolerance to abiotic stress and/or for reducing the consequence of abiotic stress in a plant and/or part thereof. In some aspects, the method comprises contacting a plant and/or part thereof with a first composition comprising one or more of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and a second composition comprising at least one dicarboxylic acid and/or a salt thereof.

24 Claims, 3 Drawing Sheets

METHODS AND COMPOSITIONS FOR INCREASING TOLERANCE TO ABIOTIC STRESS IN PLANTS

STATEMENT OF PRIORITY

This application claims the benefit, under 35 U.S.C. § 119(e), of U.S. Provisional Application No. 62/626,350, filed Feb. 5, 2018, the entire contents of which are incorporated by reference herein.

FIELD OF THE INVENTION

The present invention relates to the field of plant response to abiotic stress and provides methods and compositions for increasing tolerance to abiotic stress in plants.

BACKGROUND OF THE INVENTION

Abiotic stresses negatively impact the growth and development of plants and result in significant reductions in crop yield and quality. Abiotic stresses include excessive or insufficient light intensity, cold temperature resulting in freezing or chilling, warm or high temperature, drought, ozone, salinity, toxic metals, nutrient poor soils, and the like.

Plants acclimate to particular stress conditions using responses that are specific for that stress. As an example, during drought conditions, a plant closes its stomata to reduce water loss. However, plants are often subjected to a combination of stresses. For example, drought conditions often are combined with excessive heat conditions. In contrast to a plant's response to drought, a plant's response to heat is to open stomata so that the leaves are cooled by transpiration. This conflict in response reduces a plant's ability to naturally adjust to such stresses.

A number of methods for alleviating abiotic stress in plants have been developed and many are available commercially. Thus, for example, shade netting, mesh, or cloth can be used to alleviate excessive heat and light. The use of reflective fabric, such as metalized surface plastics, white plastics, and foil materials on the ground of an orchard or vineyard can result in an increase in fruit size and yield with a concomitant reduction in fruit sunburn damage resulting from exposure to abiotic stress. Fruit surface temperature can be reduced through the application of low volumes of water, which cools the fruit through evaporative cooling of the surrounding air. A further method for alleviating heat stress includes the use of reflective, particle film technology (PFT), such as the commercial products RAYNOX®, SUN-SHIELD® and SURROUND®. Many of the available products and methods described above have serious shortcomings. As a consequence, additional methods and products are needed for alleviating the stress caused by abiotic factors.

The present invention overcomes previous shortcomings in the art by providing methods and compositions that increase the tolerance to abiotic stress in plants.

SUMMARY OF THE INVENTION

In one aspect, the present invention provides a method for increasing tolerance to abiotic stress in a plant and/or part thereof, the method comprising contacting a plant and/or part thereof with a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and a second composition comprising at least one dicarboxylic acid and/or a salt thereof, thereby increasing tolerance of a plant and/or part thereof to abiotic stress as compared to a control.

Another aspect of the invention provides a method for reducing the consequences of abiotic stress in a plant and/or part thereof, the method comprising contacting a plant and/or part thereof with a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and a second composition comprising at least one dicarboxylic acid and/or a salt thereof, thereby reducing the consequences of abiotic stress in the plant and/or part thereof as compared to a control.

In a further aspect, the present invention provides a synergistic composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and at least one dicarboxylic acid and/or a salt thereof.

These and other aspects of the invention will be set forth in more detail in the description of the invention that follows.

DETAILED DESCRIPTION OF THE INVENTION

Figure 1:
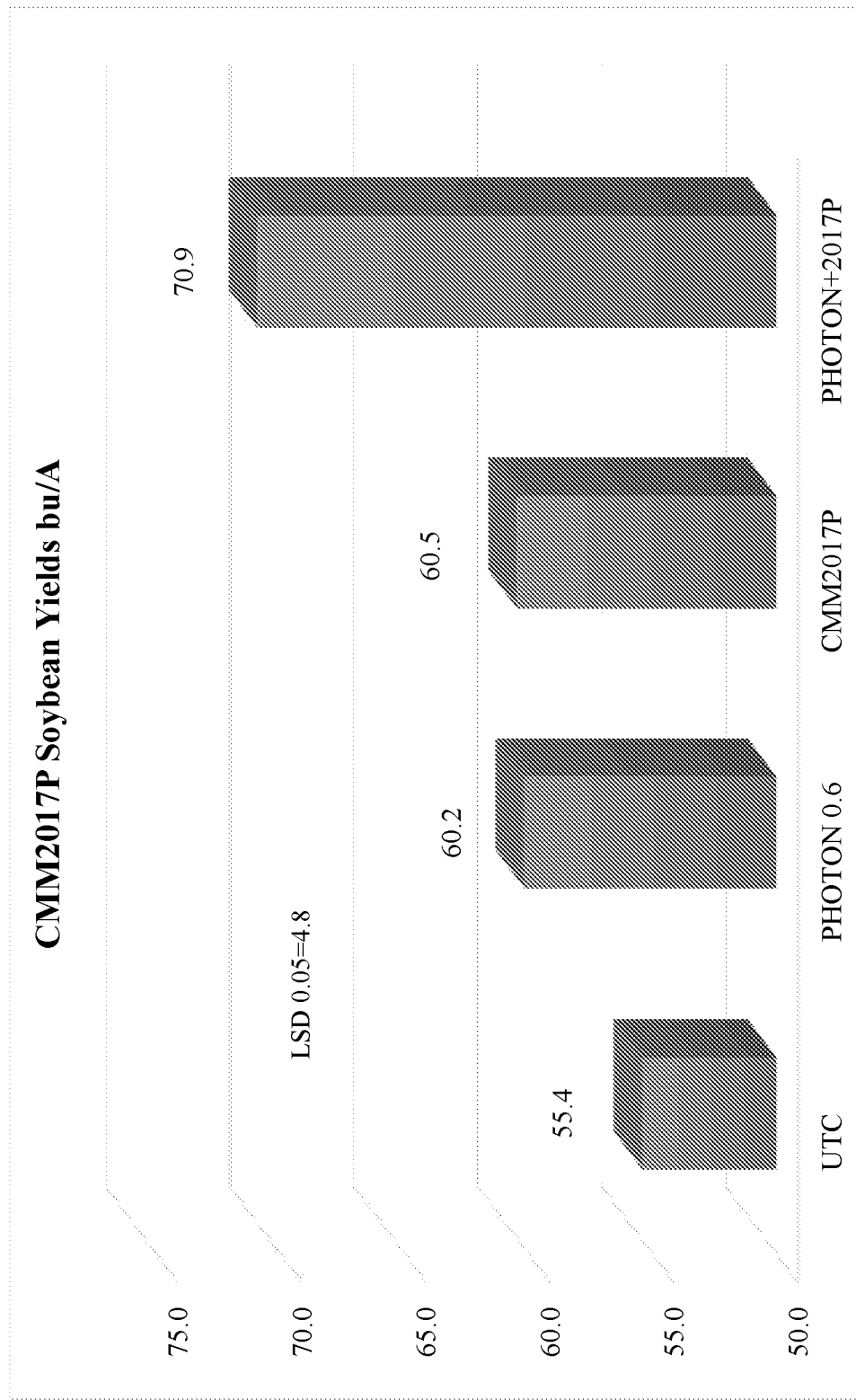
FIG. 1 provides a graphic representation of soybean yields after application of various treatments to soybean plants: UTC (untreated control); PHOTON® (blend of dicarboxylic acids); CMM2017P (aminoguanidine); and a combination of PHOTON® and CMM2017P.

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

As used herein, "a," "an" or "the" can mean one or more than one (e.g., one, two, three, four, five, six, seven, eight, nine, ten, eleven, twelve, thirteen, fourteen, fifteen, etc). For example, a plant can mean a plurality of plants and a stress can refer to one or more stresses and equivalents thereof known to those of skill in the art.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as an amount or concentration and the like, is meant to encompass variations of +10%, +5%, ±1%, ±0.5%, or even ±0.1% of the specified value as well as the specified value. For example, "about X" where X is the measurable value, is meant to include X as well as variations of +10%, ±5%, +1%, ±0.5%, or even 0.1% of X. A range provided herein for a measureable value may include any other range and/or individual value therein.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

"Alkane" as used herein refers to a difunctional linear, or branched alkyl group, which may be substituted or unsubstituted, and/or saturated, having from 1 to about 20 carbon atoms, e.g., 1, 2, 3, 4, 5, 6, 7, 8, 9, 10, 11, 12, 13, 14, 15, 16, 17, 18, 19, or 20 carbon atoms. Exemplary alkane groups include methane (—$CH_2$—); ethane (—$CH_2$—$CH_2$—); propane (—$(CH_2)_3$—); butane (—$(CH_2)_4$—); pentane (—$(CH_2)_5$—); hexane (—$(CH_2)_6$—) septan (—$(CH_2)_7$—), octane (—$(CH_2)_8$—), nonan (—$(CH_2)_9$—), and decane (—$(CH_2)_{10}$—), and the like. Thus, an alkane group can have 1 carbon atom to 10 carbon atoms (e.g., 1, 2, 3, 4, 5, 6, 7, 8, 9, or 10), 5 carbon atoms to 14 carbon atoms (e.g., 5, 6, 7, 8, 9, 10, 11, 12, 13, or 14) and/or 6 carbon atoms to 20 (e.g., 6, 7, 8, 9, 10, 11, 12, 13, 14, 15, 16, 17, 18, 19, or 20) carbons, and the like. As discussed above, the alkane group can be optionally substituted. In some embodiments, an alkane may be substituted with one or more substituents that may be selected from alkyl, alkenyl, or alkynyl.

The term "abiotic stress" as used herein refers to outside, nonliving, factors which can cause harmful effects to plants. Thus, as used herein, abiotic stress includes, but is not limited to, cold temperature that results in freezing, chilling, heat or high temperatures, drought, high light intensity, low light intensity, salinity, ozone, and/or combinations thereof. Parameters for abiotic stress factors are species specific and even variety specific and therefore vary widely according to the species/variety exposed to the abiotic stress. Thus, while one species may be severely impacted by a high temperature of 23° C., another species may not be impacted until at least 30° C., and the like. Temperatures above 30° C. result in dramatic reductions in the yields of most important crops. This is due to reductions in photosynthesis that begin at approximately 20-25° C., and the increased carbohydrate demands of crops growing at higher temperatures. The critical temperatures are not absolute, but vary depending upon such factors as the acclimatization of the crop to prevailing environmental conditions. In addition, because most crops are exposed to multiple abiotic stresses at one time, the interaction between the stresses affects the response of the plant. For example, damage from excess light occurs at lower light intensities as temperatures increase beyond the photosynthetic optimum. Water stressed plants are less able to cool overheated tissues due to reduced transpiration, further exacerbating the impact of excess (high) heat and/or excess (high) light intensity. Thus, the particular parameters for high/low temperature, light intensity, drought and the like, which impact crop productivity will vary with species, variety, degree of acclimatization and the exposure to a combination of environmental conditions.

As used herein, "an area comprising a plant and/or part thereof" refers to an agricultural field, golf course, a residential lawn, an ornamental garden, a road side, an athletic field, a recreational field, greenhouse, orchard, vineyard, and/or nursery.

"Synergistic", "synergy", or grammatical variants thereof as used herein refer to a combination exhibiting an effect greater than the effect that would be expected from the sum of the effects of the individual active ingredients of the combination alone. For example, the terms "synergistic" or "synergy" with regard to a combination of at least one of aminoguanidine, L-nitroarginine, L-nitroarginine methyl ester, 2,2'-bipyridine, 4-methylpyrazole, 8-hydroxyquinoline, caprylic acid, pyrazole, naringenin, kaempferol, quercetin, dodecanoic acid, and/or undecanoic acid, and/or a salt thereof, and at least one dicarboxylic acid, or salt thereof, for increasing tolerance to abiotic stress and/or for reducing the consequence of abiotic stress in a plant and/or part thereof, refers to an efficacy for increasing tolerance to abiotic stress and/or for reducing the consequence of abiotic stress in a plant and/or part thereof, that is greater than that which would be expected from the sum of the individual effects of at least one of amino guanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and at least one dicarboxylic acid, or salt thereof, source alone.

As used herein, the terms "increase," "increasing," "increased," "enhance," "enhanced," "enhancing," and "enhancement" (and grammatical variations thereof) describe an elevation of at least about 25%, 50%, 75%, 100%, 150%, 200%, 300%, 400%, 500% or more as compared to a control. In some embodiments, as used herein, these terms refer to an enhancement or augmentation of, for example, number of fruit produced by a plant, as a response to alleviating abiotic stress to which the plant is exposed. Thus, in some embodiments, a plant or plant part contacted with a composition(s) of the invention (e.g., first and second compositions, synergistic composition) may have increased tolerance to abiotic stress as compared to a plant or plant part that has not been contacted with the composition(s) of the invention.

As used herein, the terms "reduce," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In some embodiments, the reduction may result in no or essentially no (i.e., an insignificant amount, e.g., less than about 10% or even 5%) detectable activity or amount. Thus, in some embodiments, as used herein these terms refer to a diminished, a decrease in, or a diminution in, for example, plant size, as a response to abiotic stress. Thus, in some embodiments, a plant and/or part thereof contacted with a composition(s) of the invention (e.g., first and second compositions, synergistic composition) may have reduced consequences of abiotic stress as compared to a plant and/or part thereof that has not been contacted with the composition(s) of the invention.

An "increased tolerance to abiotic stress" as used herein refers to the ability of a plant and/or part thereof exposed to abiotic stress and contacted with a composition(s) of the invention (e.g., first and second compositions, synergistic composition) to withstand a given abiotic stress better than a control plant and/or part thereof (i.e., a plant and/or part thereof that has been exposed to the same abiotic stress but has not been contacted with the composition(s) of the present invention). Increased tolerance to abiotic stress can be measured using a variety of parameters including, but not limited to, the size and/or number of plants or parts thereof, and the like (e.g., number and/or size of fruits), the level or amount of cell division, the amount of floral abortion, the amount of sunburn damage, crop yield, and the like. Thus, in some embodiments of this invention, a plant and/or part thereof having been contacted with a composition(s) of the invention (e.g., first and second compositions, synergistic composition), and having increased tolerance to the abiotic stress, for example, would have reduced flower abortion as compared to a plant and/or part thereof exposed to the same stress but not having been contacted with the composition(s) of the invention.

"A consequence of abiotic stress" as used herein refers to the effects, results or outcome of exposure of a plant and/or part thereof to one or more than one (e.g., one, two, three, four, five, etc.) abiotic stress. Thus, a consequence of abiotic stress includes, but is not limited to, sunburn damage, flower abortion, fruit drop, a reduction in the number of plants or parts thereof, a reduction in produce quality (e.g., fruit quality) measured as color, finish, and/or shape (e.g., reduced quality of produce due to appearance and texture), a reduction in the size of plants or parts thereof, a reduction in cell division, and the like. Thus, the consequences of abiotic stress are typically those consequences which negatively impact on crop yield and quality.

"Reducing the consequence of abiotic stress" as used herein refers to the ability of a plant and/or part thereof exposed to abiotic stress and contacted with a composition(s) of the invention to withstand a given abiotic stress better than a control plant and/or part thereof (i.e., a plant and/or part thereof that has been exposed to the same abiotic stress but has not been contacted with the composition(s) of the present invention), thereby diminishing or reducing the consequence of abiotic stress in the plant and/or part thereof. The consequence of abiotic stress can be measured using a variety of parameters including, but not limited to, the size and/or number of plants or parts thereof, and the like (e.g., number and/or size of fruits), the level or amount of cell division, the amount of floral abortion, the amount of fruit drop, the amount of sunburn damage, and the like, and combinations thereof. Thus, reducing the consequence of abiotic stress as used herein can also mean maintaining the size and number of plants and/or parts thereof, and the like (e.g., number and/or size of fruits), the level or amount of cell division, the amount of floral abortion, the amount of fruit drop and/or the amount of sunburn damage and/or other quality parameters (e.g., fruit color, finish and/or shape) as observed in a control plant which has not been exposed to the abiotic stress.

The present inventor has surprisingly discovered that a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid (and/or salt thereof) and a second composition comprising at least one dicarboxylic acid (either as a single composition (e.g., a combined or a synergistic composition) or in two separate compositions) can have a synergistic effect when they are contacted with a plant and/or part thereof, resulting in an increase in the tolerance of the plant and/or plant part to abiotic stress and/or a reduction in the consequence of abiotic stress in the plant and/or part thereof as compared to an untreated control (e.g., a plant not contacted (not treated) with the first composition of the invention and/or the second composition of the invention as described herein).

Accordingly, in some embodiments, the present invention provides a method for increasing tolerance to abiotic stress and/or for reducing the consequence of abiotic stress in a plant and/or part thereof, comprising contacting a plant and/or part thereof with a synergistic combination of an effective amount of each of a first composition and a second composition, wherein the first composition comprises, consists essentially of, or consists of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof and the second composition comprises, consists essentially of, or consists of at least one dicarboxylic acid and/or a salt thereof, thereby increasing tolerance to abiotic stress and/or for reducing the consequence of abiotic stress in a plant and/or part thereof as compared to a control plant that has not been contacted with the first composition and/or second composition.

In some embodiments, the present invention provides a method for increasing tolerance to abiotic stress and/or for reducing the consequence of abiotic stress in a plant and/or part thereof, comprising contacting a plant and/or part thereof with an effective amount of a synergistic composition comprising, consisting essentially of, or consisting of at least one compound of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and at least one dicarboxylic acid and/or a salt thereof, thereby increasing the tolerance of the plant and/or plant part to abiotic stress and/or reducing the consequence of abiotic stress to the plant and/or plant part as compared to a control plant that has not been contacted with the synergistic composition.

Thus, in some embodiments, a method is provided for reducing the amount of flower abortion or fruit drop in a plant and/or part thereof exposed to abiotic stress comprising contacting the plant and/or part thereof with an effective amount of a first composition comprising, consisting essentially of, or consisting of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and an effective amount of a second composition comprising, consisting essentially of, or consisting of at least one dicarboxylic acid and/or a salt thereof, thereby reducing flower abortion or fruit drop as compared to a control plant and/or part thereof exposed to the same stress but not having been contacted with said first and/or second composition. In some embodiments, a method is provided for reducing the amount of flower abortion or fruit drop in a plant and/or part thereof exposed to abiotic stress comprising contacting the plant and/or part thereof with an effective amount of a synergistic composition comprising, consisting essentially of, or consisting of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, a quercetin, dodecanoic acid, and/or undecanoic acid, and/or a salt thereof; and at least one dicarboxylic acid and/or a salt thereof, thereby reducing flower abortion or fruit drop as compared to a control plant and/or part thereof exposed to the same stress but not having been contacted with said synergistic composition.

In some embodiments, the consequence of abiotic stress is sunburn damage. Thus, in some embodiments, a method is provided for reducing sunburn damage in a plant and/or part thereof comprising contacting a plant and/or part thereof with an effective amount of a first composition comprising, consisting essentially of, or consisting of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and an effective amount of a second composition comprising, consisting essentially of, or consisting of at least one dicarboxylic acid and/or a salt thereof, thereby reducing the amount of sunburn damage as compared to a control plant and/or part thereof exposed to the same stress but not having been contacted with the compositions of the invention (e.g., the first and/or second composition and/or a composition comprising the first and second compositions (e.g., synergistic composition)). In some embodiments, a method is provided for reducing sunburn damage in a plant and/or part thereof comprising contacting a plant and/or part thereof with an effective amount of a synergistic composition of the invention comprising, consisting essentially of, or consisting of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and at least one dicarboxylic acid and/or a salt thereof, thereby reducing the amount of sunburn damage as compared to a control plant and/or part thereof exposed to the same stress but not having been contacted with the compositions of the invention. In some aspects of the invention, the abiotic stress may be high temperature and high light intensity and the consequence of this combination of abiotic stresses may be sunburn damage.

In some embodiments, the consequence of abiotic stress may be reduced fruit size. Thus, in some aspects, the invention provides a method for reducing the reduction in fruit size in a plant and/or part thereof comprising: contacting a plant and/or part thereof with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and an effective amount of a second composition comprising at least one dicarboxylic acid and/or a salt thereof, thereby reducing the reduction in fruit size as compared to a control plant and/or part thereof exposed to the same stress but not having been contacted with the compositions of the invention. In some embodiments, the invention provides a method for reducing the reduction in fruit size in a plant and/or part thereof comprising: contacting a plant and/or part thereof with an effective amount of a synergistic composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof; and at least one dicarboxylic acid and/or a salt thereof, thereby reducing the reduction in fruit size as compared to a control plant and/or part thereof exposed to the same stress but not having been contacted with the compositions of the invention.

Example structures of compounds of that may be present in a first composition of the invention include:

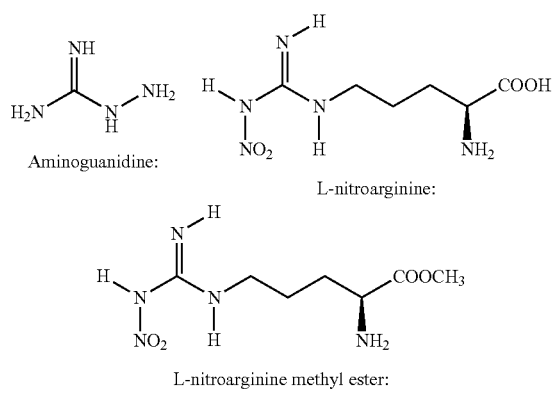

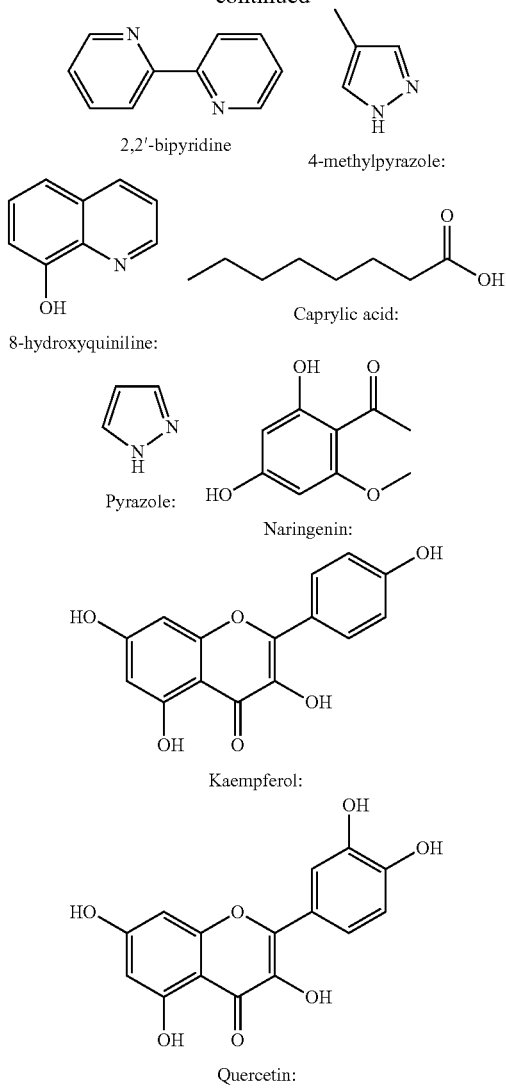

In some embodiments, a first composition of the invention and/or a synergistic composition of the invention comprises at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, in any combination. In some embodiments, a first composition and/or a synergistic composition may comprise aminoguanidine, L-nitroarginine, and/or L-nitroarginine methyl ester, and/or a salt thereof, in any combination. In some embodiments, a first composition and/or a synergistic composition may comprise dodecanoic acid, and/or undecanoic acid, and/or a salt thereof, in any combination In some embodiments, a second composition of the invention and/or a synergistic composition of the invention may comprise at least one dicarboxylic acid (e.g., comprised in the second composition or the synergistic composition), wherein the at least one dicarboxylic acid is a compound having the formula HOOC—R—COOH, and R is a C5 to C14 alkane. Thus, in some embodiments, R may be a C5, C6, C7, C8, C9, C10, C11, C12, C13, or C14 alkane. In some embodiments of the present invention, R may be a C6 alkane. In some embodiments, R may be a C7 alkane. In some embodiments, R may be a C8 alkane. In some embodiments, R may be a C9 alkane. In additional embodiments, R may be a C10 alkane.

Thus, in some embodiments of this invention, the dicarboxylic acid may be pimelic acid (heptanedioic acid), suberic acid (octanedioic acid), azelaic acid (nonanedioic acid), sebacic acid (decanedioic acid), undecanedioic acid, dodecanedioic acid, brassylic acid (tridecanedioic acid), thapsic acid (hexadecanedioic acid), tetradecanedioic acid, and/or pentadecanedioic acid, and/or derivatives thereof (e.g. salts), and/or any combination thereof.

Accordingly, in some embodiments, the dicarboxylic acid may be one or more of suberic acid, azelaic acid, sebacic acid, and/or undecanedioic acid, and/or salts thereof. In some embodiments, the dicarboxylic acid may be azelaic acid and/or a salt thereof. In some embodiments, the dicarboxylic acid may be sebacic acid and/or a salt thereof. In some embodiments, the dicarboxylic acid may be suberic acid and/or a salt thereof. In some embodiments, the dicarboxylic acid may be undecanedioic acid and/or a salt thereof.

As used herein, a derivative of a dicarboxylic acid may include any compound that is derived from a dicarboxylic acid as described herein. Thus, in some embodiments, a derivative may be a salt or an ester of a dicarboxylic acid. Non-limiting examples of a dicarboxylic acid salt include mono-sodium dicarboxylate, di-sodium dicarboxylate, mono-potassium dicarboxylate, di-potassium dicarboxylate, and the like. Examples of dicarboxylic acid esters of include, but are not limited to, dimethyl-dicarboxylate, diethyl-dicarboxylate, dipropyl-dicarboxylate, dihexyl-dicarboxylate, di-(t-butyl)-dicarboxylate and the like. Thus, in some embodiments, additional non-limiting examples of dicarboxylic acid derivatives include mono-sodium azelate, mono-potassium azelate, mono-sodium pimelate, di-sodium sebacic acid, mono-potassium brassylate or di-potassium sebacic acid, dimethyldodecanedioic acid, diethylthapsic acid, dipropylazelate, dihexylsuberic acid, di-(t-butyl) pimelate, and the like.

In some embodiments, a composition of the invention (e.g., a second composition, a synergistic composition) comprising a dicarboxylic acid or salt thereof may comprise one or more (e.g., one, two, three, four, five, six, seven, eight, nine, ten, eleven, twelve, thirteen, fourteen, fifteen, etc.) different dicarboxylic acids or derivatives thereof. Thus, in some embodiments, the present invention also provides a method for increasing tolerance to, and/or reducing the consequences, of abiotic stress in a plant and/or part thereof, comprising contacting the plant and/or part thereof with a composition comprising one, two, three, four, five, six, seven, or more dicarboxylic acids and/or derivatives thereof. In some aspects of the invention, a plant and/or part thereof may be contacted with a one or more than one composition (e.g., one, two, three, four, five, six, seven, eight, nine, ten, eleven, twelve, thirteen, fourteen, fifteen, etc) comprising one or more than one (e.g., one, two, three, four, five, six, seven, eight, nine, ten, eleven, twelve, thirteen, fourteen, fifteen, etc) dicarboxylic acids and/or derivatives thereof.

Thus, in some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof;

and at least one dicarboxylic acid and/or salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and at least one dicarboxylic acid and/or salt thereof. In some embodiments, a synergistic composition of the invention may comprise, consist essentially of, or consist of undecanoic acid, and/or a salt thereof, and at least one dicarboxylic acid and/or salt thereof. In some embodiments, a synergistic composition of the invention may comprise, consist essentially of, or consist of dodecanoic acid and/or a salt thereof, and at least one dicarboxylic acid and/or salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and at least one dicarboxylic acid having the formula HOOC—R—COOH, wherein R is C6 to 9 alkane, and/or a salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and at least one dicarboxylic acid having the formula HOOC—R—COOH, wherein R is C6 to 9 alkane, and/or a salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and at least one dicarboxylic acid having the formula HOOC—R—COOH, wherein R is C6 to 9 alkane, and/or a salt thereof. In some embodiments, a synergistic composition of the invention may comprise, consist essentially of, or consist of undecanoic acid, and/or a salt thereof, and at least one dicarboxylic acid having the formula HOOC—R—COOH, wherein R is C6 to 9 alkane, and/or a salt thereof. In some embodiments, a synergistic composition of the invention may comprise, consist essentially of, or consist of dodecanoic acid and/or a salt thereof, and at least one dicarboxylic acid having the formula HOOC—R—COOH, wherein R is C6 to 9 alkane, and/or a salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and at least one of suberic acid, azelaic acid, sebacic acid, and/or unedecanedioic acid, and/or salt thereof. In some embodiments, a synergistic composition may comprise, consist essentially of, or consist of aminoguanidine, L-nitroarginine, and/or L-nitroarginine methyl ester, and/or a salt thereof, or any combination thereof, and at least one of suberic acid, azelaic acid, sebacic acid, and/or unedecanedioic acid, and/or salt thereof. In some embodiments, a synergistic composition of the invention may comprise, consist essentially of, or consist of undecanoic acid, and/or a salt thereof, and at least one of suberic acid, azelaic acid, sebacic acid, and/or unedecanedioic acid, and/or salt thereof. In some embodiments, a synergistic composition of the invention may comprise, consist essentially of, or consist of dodecanoic acid and/or a salt thereof, and at least one of suberic acid, azelaic acid, sebacic acid, and/or unedecanedioic acid, and/or salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and suberic acid, azelaic acid, sebacic acid, and unedecanedioic acid, or salts thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and suberic acid, azelaic acid, sebacic acid, and unedecanedioic acid, or salts thereof. In some embodiments, a synergistic composition of the invention may comprise, consist essentially of, or consist of undecanoic acid, and/or a salt thereof, and suberic acid, azelaic acid, sebacic acid, and unedecanedioic acid, or salts thereof. In some embodiments, a synergistic composition of the invention may comprise, consist essentially of, or consist of dodecanoic acid and/or a salt thereof, and suberic acid, azelaic acid, sebacic acid, and unedecanedioic acid, or salts thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof and suberic acid and/or salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and suberic acid and/or salt thereof. In some embodiments, a synergistic composition of the invention may comprise, consist essentially of, or consist of undecanoic acid, and/or a salt thereof, and suberic acid and/or salt thereof. In some embodiments, a synergistic composition of the invention may comprise, consist essentially of, or consist of dodecanoic acid and/or a salt thereof, and suberic acid and/or salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and azelaic acid and/or salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and azelaic acid and/or salt thereof. In some embodiments, a synergistic composition of the invention may comprise, consist essentially of, or consist of undecanoic acid, and/or a salt thereof, and azelaic acid and/or salt thereof. In some embodiments, a synergistic composition of the invention may comprise, consist essentially of, or consist of dodecanoic acid and/or a salt thereof, and azelaic acid and/or salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and sebacic acid and/or salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and sebacic acid and/or salt thereof. In some embodiments, a synergistic composition of the invention may comprise, consist essentially of, or consist of undecanoic acid, and/or a salt thereof, and sebacic acid and/or salt thereof. In some embodiments, a synergistic composition of the invention may comprise, consist essentially of, or consist of dodecanoic acid and/or a salt thereof, and sebacic acid and/or salt thereof.

In some embodiments, a synergistic composition of the invention may comprise, consist essentially of, or consist of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and unedecandioic acid and/or salt thereof. In some embodiments, a synergistic composition of the invention may comprise, consist essentially of, or consist of aminoguanidine, L-nitroarginine, and/or L-nitroarginine methyl ester, and/or a salt thereof, or any combination thereof, and unedecandioic acid and/or salt thereof. In some embodiments, a synergistic composition of the invention may comprise, consist essentially of, or consist of undecanoic acid, and/or a salt thereof, and unedecandioic acid and/or salt thereof. In some embodiments, a synergistic composition of the invention may comprise, consist essentially of, or consist of dodecanoic acid and/or a salt thereof, and unedecandioic acid and/or salt thereof.

Accordingly, in some embodiments, the present invention provides a method for increasing tolerance to abiotic stress and/or for reducing the consequence of abiotic stress in a plant and/or part thereof, comprising contacting a plant and/or part thereof with a synergistic combination of an effective amount of a first composition comprising at least one of aminoguanidine, L-nitroarginine, and/or L-nitroarginine methyl ester, and/or salts thereof, or any combination thereof, and an effective amount a second composition comprising of at least one dicarboxylic acid and/or salt thereof. In some embodiments, the plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof., and a second composition comprising an effective amount of at least one dicarboxylic acid having the formula HOOC—R—COOH, wherein R is C6 to 9 alkane, and/or salt thereof. In some embodiments, the plant and/or part thereof may be contacted with an effective amount of a first composition comprising aminoguanidine, L-nitroarginine, and/or L-nitroarginine methyl ester, and/or salts thereof, or any combination thereof, and a second composition comprising an effective amount of at least one dicarboxylic acid having the formula HOOC—R—COOH, wherein R is C6 to 9 alkane, and/or salt thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of at least one dicarboxylic acid having the formula HOOC—R—COOH, wherein R is C6 to 9 alkane, and/or salt thereof.

In some embodiments, a plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and an effective amount of a second composition comprising at least one of suberic acid, azelaic acid, sebacic acid, and/or unedecanedioic acid and/or salts thereof. In some embodiments, a plant and/or part thereof may be contacted with an effective amount of a first composition comprising aminoguanidine, L-nitroarginine, and/or L-nitroarginine methyl ester, and/or salts thereof, or any combination thereof, and an effective amount of a second composition comprising at least one of suberic acid, azelaic acid, sebacic acid, and/or unedecanedioic acid and/or salts thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of a second composition comprising at least one of suberic acid, azelaic acid, sebacic acid, and/or unedecanedioic acid and/or salts thereof.

In some embodiments, a plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and an effective amount of a second composition comprising suberic acid and/or salts thereof. In some embodiments, a plant and/or part thereof may be contacted with an effective amount of a first composition comprising aminoguanidine, L-nitroarginine, and/or L-nitroarginine methyl ester, and/or salts thereof, or any combination thereof, and an effective amount of a second composition comprising suberic acid and/or salts thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of a second composition comprising suberic acid, and/or salts thereof.

In some embodiments, a plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and an effective amount of a second composition comprising azelaic acid and/or salt thereof. In some embodiments, a plant and/or part thereof may be contacted with an effective amount of a first composition comprising aminoguanidine, L-nitroarginine, and/or L-nitroarginine methyl ester, and/or salts thereof, or any combination thereof, and an effective amount of a second composition comprising azelaic acid and/or salt thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of a second composition comprising azelaic acid, and/or salts thereof.

In some embodiments, a plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and an effective amount of a second composition comprising sebacic acid and/or salt thereof. In some embodiments, a plant and/or part thereof may be contacted with an effective amount of a first composition comprising aminoguanidine, L-nitroarginine, and/or L-nitroarginine methyl ester, and/or salts thereof, or any combination thereof, and an effective amount of a second composition comprising sebacic acid and/or salt thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of a second composition comprising sebacic acid, and/or salts thereof.

In some embodiments, a plant and/or part thereof may be contacted with an effective amount of a first composition comprising at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, and/or any combination thereof; and an effective amount of a second composition comprising unedecandioic acid and/or salt thereof. In some embodiments, a plant and/or part thereof may be contacted with an effective amount of a first composition comprising aminoguanidine, L-nitroarginine, and/or L-nitroarginine methyl ester, and/or salts thereof, or any combination thereof, and an effective amount of a second composition comprising unedecandioic acid and/or salt thereof. In some embodiments, the plant and/or part thereof may be contacted with an effective amount of a first composition comprising dodecanoic acid, and/or undecanoic acid, and/or salts thereof, or any combination thereof, and a second composition comprising an effective amount of a second composition comprising unedecandioic acid, and/or salts thereof.

In some embodiments, the amount (e.g., effective amount) of the at least one aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof in a first composition of the invention and/or in a synergistic composition of the invention may be in the range of about $1 \times 10^{-9}$ M to about 1 M. Thus, in some embodiments, an effective amount of the aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof, in a first composition of the invention and/or in a synergistic composition of the invention for increasing tolerance to abiotic stress and/or for reducing the consequence of abiotic stress in a plant and/or part thereof may be in the range of about $1 \times 10^{-9}$ M to about 1 M. In some embodiments, when the composition (e.g., synergistic or first composition) comprises more than one of aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof, the amount of each of aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof in the composition may be in the range of about $1 \times 10^{-9}$ M to about 1 M, or in some embodiments, the total amount of the more than one of aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof may be in the range of about $1 \times 10^{-9}$ M to about 1 M.

Thus, in some embodiments, the amount (e.g., effective amount) of aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof in a first or a synergistic composition of the invention may be in the range of about $5 \times 10^{-9}$ M to about 1 M; about $1 \times 10^{-8}$ M to about 1 M, about $1 \times 10^{-7}$ M to about 1 M, about $1 \times 10^{-6}$ M to about 1 M, about $1 \times 10^{-5}$ M to about 1 M, about $1 \times 10^{-4}$ M to about 1 M, about $1 \times 10^{-3}$ M to about 1 M, about $1 \times 10^{-2}$ M to about 1 M, about $1 \times 10^{-1}$ M to about 1 M, about $1 \times 10^{-9}$ M to about $1 \times 10^{-1}$ M, about $1 \times 10^{-8}$ M to about $1 \times 10^{-1}$ M, about $1 \times 10^{-7}$ M to about $1 \times 10^{-1}$ M, about $1 \times 10^{-6}$ M to about $1 \times 10^{-1}$ M, about $1 \times 10^{-5}$ M to about $1 \times 10^{-1}$ M, about $1 \times 10^{-4}$ M to about $1 \times 10^{-1}$ M, about $1 \times 10^{-3}$ M to about $1 \times 10^{-1}$ M, about $1 \times 10^{-2}$ M to about $1 \times 10^{-1}$ M, about $5 \times 10^{-9}$ M to about $5 \times 10^{-1}$ M, about $5 \times 10^{-8}$ M to about $5 \times 10^{-1}$ M, about $5 \times 10^{-7}$ M to about $5 \times 10^{-1}$ M, about $5 \times 10^{-6}$ M to about $5 \times 10^{-1}$ M, about $5 \times 10^{-5}$ M to about $5 \times 10^{-1}$ M, about $5 \times 10^{-4}$ M to about $5 \times 10^{-1}$ M, about $5 \times 10^{-3}$ M to about $5 \times 10^{-1}$ M, about $5 \times 10^{-2}$ M to about $5 \times 10^{-1}$ M, about $1 \times 10^{-9}$ M to about $1 \times 10^{-2}$ M, about $1 \times 10^{-8}$ M to about $1 \times 10^{-2}$ M, about $1 \times 10^{-7}$ M to about $1 \times 10^{-2}$ M, about $1 \times 10^{-6}$ M to about $1 \times 10^{-2}$ M, about $1 \times 10^{-5}$ M to about $1 \times 10^{-2}$ M, about $1 \times 10^{-4}$ M to about $1 \times 10^{-2}$ M, about $1 \times 10^{-3}$ M to about $1 \times 10^{-2}$ M, about $5 \times 10^{-9}$ M to about $5 \times 10^{-1}$ M, about $5 \times 10^{-8}$ M to about $5 \times 10^{-2}$ M, about $5 \times 10^{-7}$ M to about $5 \times 10^{-2}$ M, about $5 \times 10^{-6}$ M to about $5 \times 10^{-2}$ M, about $5 \times 10^{-5}$ M to about $5 \times 10^{-2}$ M, about $5 \times 10^{-4}$ M to about $5 \times 10^{-2}$ M, about $1 \times 10^{-9}$ M to about $1 \times 10^{-3}$ M, about $1 \times 10^{-8}$ M to about $1 \times 10^{-3}$ M, about $1 \times 10^{-7}$ M to about $1 \times 10^{-3}$ M, about $1 \times 10^{-6}$ M to about $1 \times 10^{-3}$ M, about $1 \times 10^{-5}$ M to about $1 \times 10^{-3}$ M, about $1 \times 10^{4}$ M to about $1 \times 10^{-5}$ M, about $5 \times 10^{-9}$ M to about $5 \times 10^{-3}$ M, about $5 \times 10^{-8}$ M to about $5 \times 10^{-3}$ M, about $5 \times 10^{-7}$ M to about $5 \times 10^{-3}$ M, about $5 \times 10^{-6}$ M to about $5 \times 10^{-3}$ M, about $5 \times 10^{-5}$ M to about $5 \times 10^{-3}$ M, about $5 \times 10^{4}$ M to about $5 \times 10^{-3}$ M, about $1 \times 10^{-9}$ M to about $1 \times 10^{-4}$ M, about $1 \times 10^{-8}$ M to about $1 \times 10^{-4}$ M, from about $1 \times 10^{-7}$ M to about $1 \times 10^{4}$ M, about $1 \times 10^{-6}$ M to about $1 \times 10^{-4}$ M, about $1 \times 10^{-5}$ M to about $1 \times 10^{-4}$ M, about $5 \times 10^{-9}$ M to about $5 \times 10^{-4}$ M, about $5 \times 10^{-8}$ M to about $5 \times 10^{-4}$ M, from about $5 \times 10^{-7}$ M to about $5 \times 10^{-4}$ M, about $5 \times 10^{-6}$ M to about $5 \times 10^{-4}$ M, about $5 \times 10^{-5}$ M to about $5 \times 10^{-4}$ M, about $1 \times 10^{-9}$ M to about $1 \times 10^{-5}$ M, about $1 \times 10^{-8}$ M to about $1 \times 10^{-5}$ M, about $1 \times 10^{-7}$ M to about $1 \times 10^{-5}$ M, about $1 \times 10^{-6}$ M to about $1 \times 10^{-5}$ M, about $1 \times 10^{-9}$ M to about $1 \times 10^{-6}$ M, about $1 \times 10^{-8}$ M to about $1 \times 10^{-6}$ M, about $1 \times 10^{-7}$ M to about $1 \times 10^{-6}$ M, about $1 \times 10^{-9}$ M to about $1 \times 10^{-8}$ M, about $5 \times 10^{-9}$ M to about $5 \times 10^{-5}$ M, about $5 \times 10^{-8}$ M to about $5 \times 10^{-5}$ M, about $5 \times 10^{-7}$ M to about $5 \times 10^{-5}$ M, about $5 \times 10^{-6}$ M to about $5 \times 10^{-5}$ M, about $5 \times 10^{-9}$ M to about $5 \times 10^{-6}$ M, about $5 \times 10^{-8}$ M to about $5 \times 10^{-6}$ M, about $5 \times 10^{-7}$ M to about $5\times10^{-6}$ M, about $5\times10^{-9}$ M to about $5\times10^{-8}$ M, and any value or range therein.

In some embodiments, the amount (e.g., effective amount) of aminoguanidine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or salts thereof in a composition of the invention may be about $1\times10^{-9}$ M, $2\times10^{-9}$ M, $3\times10^{-9}$ M, $4\times10^{-9}$ M, $5\times10^{-9}$ M, $6\times10^{-9}$ M, $7\times10^{-9}$ M, $8\times10^{-9}$ M, $9\times10^{-9}$ M, $1\times10^{-8}$ M, $2\times10^{-8}$ M, $3\times10^{-8}$ M, $4\times10^{-8}$ M, $5\times10^{-8}$ M, $6\times10^{-8}$ M, $7\times10^{-8}$ M, $8\times10^{-8}$ M, $9\times10^{-8}$ M, $1\times10^{-7}$ M, $2\times10^{-7}$ M, $3\times10^{-7}$ M, $4\times10^{-7}$ M, $5\times10^{-7}$ M, $6\times10^{-7}$ M, $7\times10^{-7}$ M, $8\times10^{-7}$ M, $9\times10^{-7}$ M, $1\times10^{-6}$ M, $2\times10^{-6}$ M, $3\times10^{-6}$ M, $4\times10^{-6}$ M, $5\times10^{-6}$ M, $6\times10^{-6}$ M, $7\times10^{-6}$ M, $8\times10^{-6}$ M, $9\times10^{-6}$ M, $1\times10^{-5}$ M, $2\times10^{-5}$ M, $3\times10^{-5}$ M, $4\times10^{-5}$ M, $5\times10^{-5}$ M, $6\times10^{-5}$ M, $7\times10^{-5}$ M, $8\times10^{-5}$ M, $9\times10^{-5}$ M, $1\times10^{-4}$ M, $2\times10^{-4}$ M, $3\times10^{-4}$ M, $4\times10^{-4}$ M, $5\times10^{-4}$ M, $6\times10^{-4}$ M, $7\times10^{-4}$ M, $8\times10^{-4}$ M, $9\times10^{-4}$ M, $1\times10^{-3}$ M, $2\times10^{-3}$ M, $3\times10^{-3}$ M, $4\times10^{-3}$ M, $5\times10^{-3}$ M, $6\times10^{-3}$ M, $7\times10^{-3}$ M, $8\times10^{-3}$ M, $9\times10^{-3}$ M, $1\times10^{-2}$ M, $2\times10^{-2}$ M, $3\times10^{-2}$ M, $4\times10^{-2}$ M, $5\times10^{-2}$ M, $6\times10^{-2}$ M, $7\times10^{-2}$ M, $8\times10^{-2}$ M, $9\times10^{-2}$ M, $1\times10^{-1}$ M, $2\times10^{-1}$ M, $3\times10^{-1}$ M, $4\times10^{-1}$ M, $5\times10^{-1}$ M, $6\times10^{-1}$ M, $7\times10^{-1}$ M, $8\times10^{-1}$ M, $9\times10^{-1}$ M, 1 M, or any value or range therein.

In some embodiments, an amount of at least one dicarboxylic acid, and/or a salt thereof, in a second composition of the invention and/or in a synergistic composition of the invention may be in the range of about $1\times10^{-9}$ M to about 1 M. Thus, in some embodiments, an effective amount in the second composition of the invention and/or in the synergistic composition of the invention of the at least one dicarboxylic acid, and/or a salt thereof, for increasing tolerance to abiotic stress and/or for reducing the consequence of abiotic stress in a plant and/or part thereof may be in the range of about $1\times10^{-9}$ M to about 1 M. In some embodiments, when the composition (e.g., synergistic or second composition) comprises more than one dicarboxylic acid, the amount of each dicarboxylic acid in the composition may be in the range of about $1\times10^{-9}$ M to about 1 M, or in some embodiments, the total amount of the more than one dicarboxylic acid may be in the range of about $1\times10^{-9}$ M to about 1 M.

Thus, in some embodiments, the amount (e.g., effective amount) of a dicarboxylic acid, and/or salt thereof in a second composition of the invention or a synergistic composition of the invention may be in the range of about $5\times10^{-9}$ M to about 1 M, about $1\times10^{-8}$ M to about 1 M, about $1\times10^{-7}$ M to about 1 M, about $1\times10^{-6}$ M to about 1 M, about $1\times10^{-5}$ M to about 1 M, about $1\times10^{-4}$ M to about 1 M, about $1\times10^{-3}$ M to about 1 M, about $1\times10^{-2}$ M to about 1 M, about $1\times10^{-1}$ M to about 1 M, about $1\times10^{-9}$ M to about $1\times10^{-1}$ M, about $1\times10^{-8}$ M to about $1\times10^{-1}$ M, about $1\times10^{-7}$ M to about $1\times10^{-1}$ M, about $1\times10^{-6}$ M to about $1\times10^{-1}$ M, about $1\times10^{-5}$ M to about $1\times10^{-1}$ M, about $1\times10^{-4}$ M to about $1\times10^{-1}$ M, about $1\times10^{-3}$ M to about $1\times10^{-1}$ M, about $1\times10^{-2}$ M to about $1\times10^{-1}$ M, about $5\times10^{-9}$ M to about $5\times10^{-1}$ M, about $5\times10^{-8}$ M to about $5\times10^{-1}$ M, about $5\times10^{-7}$ M to about $5\times10^{-1}$ M, about $5\times10^{-6}$ M to about $5\times10^{-1}$ M, about $5\times10^{-5}$ M to about $5\times10^{-1}$ M, about $5\times10^{-4}$ M to about $5\times10^{-1}$ M, about $5\times10^{-3}$ M to about $5\times10^{-1}$ M, about $5\times10^{-2}$ M to about $5\times10^{-1}$ M, about $1\times10^{-9}$ M to about $1\times10^{-2}$ M, about $1\times10^{-8}$ M to about $1\times10^{-2}$ M, about $1\times10^{-7}$ M to about $1\times10^{-2}$ M, about $1\times10^{-6}$ M to about $1\times10^{-2}$ M, about $1\times10^{-5}$ M to about $1\times10^{-2}$ M, about $1\times10^{-4}$ M to about $1\times10^{-2}$ M, about $1\times10^{-3}$ M to about $1\times10^{-2}$ M, about $5\times10^{-9}$ M to about $5\times10^{-2}$ M, about $5\times10^{-8}$ M to about $5\times10^{-2}$ M, about $5\times10^{-7}$ M to about $5\times10^{-2}$ M, about $5\times10^{-6}$ M to about $5\times10^{-2}$ M, about $5\times10^{-5}$ M to about $5\times10^{-2}$ M, about $5\times10^{-4}$ M to about $5\times10^{-2}$ M, about $1\times10^{-9}$ M to about $1\times10^{-3}$ M, about $1\times10^{-8}$ M to about $1\times10^{-3}$ M, about $1\times10^{-6}$ M to about $1\times10^{-3}$ M, about $1\times10^{-5}$ M to about $1\times10^{-3}$ M, about $1\times10^{-4}$ M to about $1\times10^{-3}$ M, about $5\times10^{-9}$ M to about $5\times10^{-3}$ M, about $5\times10^{-8}$ M to about $5\times10^{-3}$ M, about $5\times10^{-7}$ M to about $5\times10^{-3}$ M, about $5\times10^{-6}$ M to about $5\times10^{-3}$ M, about $5\times10^{-5}$ M to about $5\times10^{-3}$ M, about $5\times10^{-4}$ M to about $5\times10^{-3}$ M, about $1\times10^{-9}$ M to about $1\times10^{-4}$ M, about $1\times10^{-8}$ M to about $1\times10^{-4}$ M, from about $1\times10^{-7}$ M to about $1\times10^{-4}$ M, about $1\times10^{-6}$ M to about $1\times10^{-4}$ M, about $1\times10^{-5}$ M to about $1\times10^{-4}$ M, about $5\times10^{-9}$ M to about $5\times10^{-4}$ M, about $5\times10^{-8}$ M to about $5\times10^{-4}$ M, from about $5\times10^{-7}$ M to about $5\times10^{-4}$ M, about $5\times10^{-6}$ M to about $5\times10^{-4}$ M, about $5\times10^{-5}$ M to about $5\times10^{-4}$ M, about $1\times10^{-9}$ M to about $1\times10^{-5}$ M, about $1\times10^{-8}$ M to about $1\times10^{-5}$ M, about $1\times10^{-7}$ M to about $1\times10^{-5}$ M, about $1\times10^{-6}$ M to about $1\times10^{-5}$ M, about $1\times10^{-9}$ M to about $1\times10^{-6}$ M, about $1\times10^{-8}$ M to about $1\times10^{-6}$ M, about $1\times10^{-7}$ M to about $1\times10^{-6}$ M, about $1\times10^{-9}$ M to about $1\times10^{-8}$ M, about $5\times10^{-9}$ M to about $5\times10^{-5}$ M, about $5\times10^{-8}$ M to about $5\times10^{-5}$ M, about $5\times10^{-7}$ M to about $5\times10^{-5}$ M, about $5\times10^{-5}$ M, about $5\times10^{-6}$ M to about $5\times10^{-5}$ M, about $5\times10^{-9}$ M to about $5\times10^{-8}$ M, about $5\times10^{-8}$ M to about $5\times10^{-6}$ M, about $5\times10^{-6}$ M, about $5\times10^{-7}$ M to about $5\times10^{-6}$ M, about $5\times10^{-9}$ M to about $5\times10^{-8}$ M, and any value or range therein.

In some embodiments, the amount (e.g., effective amount) of a dicarboxylic acid, and/or salt thereof in a second composition of the invention or a synergistic composition of the invention may be about $1\times10^{-9}$ M, $2\times10^{-9}$ M, $3\times10^{-9}$ M, $4\times10^{-9}$ M, $5\times10^{-9}$ M, $6\times10^{-9}$ M, $7\times10^{-9}$ M, $8\times10^{-9}$ M, $9\times10^{-9}$ M, $1\times10^{-8}$ M, $2\times10^{-8}$ M, $3\times10^{-8}$ M, $4\times10^{-8}$ M, $5\times10^{-8}$ M, $6\times10^{-8}$ M, $7\times10^{-8}$ M, $8\times10^{-8}$ M, $9\times10^{-8}$ M, $1\times10^{-7}$ M, $2\times10^{-7}$ M, $3\times10^{-7}$ M, $4\times10^{-7}$ M, $5\times10^{-7}$ M, $6\times10^{-7}$ M, $7\times10^{-7}$ M, $8\times10^{-7}$ M, $9\times10^{-7}$ M, $1\times10^{-6}$ M, $2\times10^{-6}$ M, $3\times10^{-6}$ M, $4\times10^{-6}$ M, $5\times10^{-6}$ M, $6\times10^{-6}$ M, $7\times10^{-6}$ M, $8\times10^{-6}$ M, $9\times10^{-6}$ M, $1\times10^{-5}$ M, $2\times10^{-5}$ M, $3\times10^{-5}$ M, $4\times10^{-5}$ M, $5\times10^{-5}$ M, $6\times10^{-5}$ M, $7\times10^{-5}$ M, $8\times10^{-5}$ M, $9\times10^{-5}$ M, $1\times10^{-4}$ M, $2\times10^{-4}$ M, $3\times10^{-4}$ M, $4\times10^{-4}$ M, $5\times10^{-4}$ M, $6\times10^{-4}$ M, $7\times10^{-4}$ M, $8\times10^{-4}$ M, $9\times10^{-4}$ M, $1\times10^{-3}$ M, $2\times10^{-3}$ M, $3\times10^{-3}$ M, $4\times10^{-3}$ M, $5\times10^{-3}$ M, $6\times10^{-3}$ M, $7\times10^{-3}$ M, $8\times10^{-3}$ M, $9\times10^{-3}$ M, $1\times10^{-2}$ M, $2\times10^{-2}$ M, $3\times10^{-2}$ M, $4\times10^{-2}$ M, $5\times10^{-2}$ M, $6\times10^{-2}$ M, $7\times10^{-2}$ M, $8\times10^{-2}$ M, $9\times10^{-2}$ M, $1\times10^{-1}$ M, $2\times10^{-1}$ M, $3\times10^{-1}$ M, $4\times10^{-1}$ M, $5\times10^{-1}$ M, $6\times10^{-1}$ M, $7\times10^{-1}$ M, $8\times10^{-1}$ M, $9\times10^{-1}$ M, 1 M, or any value or range therein.

In some embodiments, contacting a plant and/or part thereof comprises administering the first composition and the second composition, separately or in combination (e.g., as a synergistic composition), to an area comprising the plant and/or part thereof. In some embodiments, the rate of administration of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid and/or a salt thereof (e.g., first composition or synergistic composition) to an area comprising the plant and/or part thereof may be in a range from about 1 microgram per hectare (Ha) to about 1 kg per Ha. Thus, in some embodiments, administration of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof (e.g., in the first composition and/or synergistic composition) to an area comprising the plant and/or part thereof may be in an amount of about 10 μg to about 1 kg, about 50 µg to about 1 kg, about 100 µg to about 1 kg, about 500 µg to about 1 kg, about 1 g to about 1 kg, about 50 g to about 1 kg, about 100 g to about 1 kg, about 500 g to about 1 kg, about 750 g to about 1 kg, about 1 µg to about 750 g, about 10 µg to about 750 g, about 50 µg to about 750 g, about 100 µg to about 750 g, about 500 µg to about 750 g, about 1 g to about 750 g, about 50 g to about 750 g, about 100 g to about 750 g, about 500 g to about 750 g, about 1 µg to about 500 g, about 10 µg to about 500 g, about 50 µg to about 500 g, about 100 µg to about 500 g, about 500 µg to about 500 g, about 1 g to about 500 g, about 50 g to about 500 g, about 100 g to about 500 g, about 250 g to about 500 g, about 1 µg to about 250 g, about 10 µg to about 250 g, about 50 µg to about 250 g, about 100 µg to about 250 g, about 250 µg to about 250 g, about 500 µg to about 250 g, about 1 g to about 250 g, about 50 g to about 250 g, about 100 g to about 250 g, about 200 g to about 250 g, about 1 µg to about 100 g, about 10 µg to about 100 g, about 50 µg to about 100 g, about 100 µg to about 100 g, about 250 µg to about 100 g, about 500 µg to about 100 g about 1 g to about 100 g, about 50 g to about 100 g, about 1µg to about 50 g, about 10 µg to about 50 g, about 50 µg to about 50 g, about 100 µg to about 50 g, about 250 µg to about 50 g, about 500 µg to about 50 g about 1 g to about 50 g, about 1 µg to about 10 g, about 10 µg to about 10 g, about 50 µg to about 10 g, about 100 µg to about 10 g, about 250 µg to about 10 g, about 1 g to about 10 g, about 2 g to about 10 g, about 5 g to about 10 g, about 1 g to about 5 g per hectare, or any value or range therein.

In some embodiments, the rate of administration of at least one of aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, dodecanoic acid, and/or undecanoic acid, and/or a salt thereof. (e.g., in the first composition and/or synergistic composition) to an area comprising the plant and/or part thereof may be in an amount of about 1 µg, 5 µg, 10 µg, 15 µg, 20 µg, 25 µg, 30 µg, 35 µg, 40 µg, 50 µg, 55 µg, 60 µg, 65 µg, 70 µg, 75 µg, 80 µg, 85 µg, 90 µg, 95 µg, 100 µg, 200 µg, 300 µg, 400 µg, 500 µg, 600 µg, 700 µg, 800 µg, 900 µg, 1 g, 2 g, 3 g, 4 g, 5 g, 6 g, 7 g, 8 g, 9 g, 10 g, 15 g, 20 g, 25 g, 30 g, 35 g, 40 g, 50 g, 55 g, 60 g, 65 g, 70 g, 75 g, 80 µg, 85 g, 90 g, 95 g, 100 g, 200 g, 300 g, 400 g, 500 g, 600 g, 700 g, 800 g, 900 g, 1000 g per hectare or any value or range therein.

In some embodiments, the rate of administration of at least one dicarboxylic acid and/or a salt thereof (e.g., in the second composition and/or synergistic composition) may be in a range from about 10 µg per hectare (Ha) to about 1 kg per Ha. Thus, in some embodiments, the rate of administration of at least one dicarboxylic acid, and/or a salt thereof (e.g., second composition or synergistic composition) to an area comprising the plant and/or part thereof may be in an amount of about 25 µg to about 1 kg, about 50 µg to about 1 kg, about 100 µg to about 1 kg, about 500 µg to about 1 kg, about 1 g to about 1 kg, about 50 g to about 1 kg, about 100 g to about 1 kg, about 500 g to about 1 kg, about 750 g to about 1 kg, about 1 µg to about 750 g, about 10 µg to about 750 g, about 50 µg to about 750 g, about 100 µg to about 750 g, about 500 µg to about 750 g, about 1 g to about 750 g, about 50 g to about 750 g, about 100 g to about 750 g, about 500 g to about 750 g, about 1 µg to about 500 g, about 10 µg to about 500 g, about 50 µg to about 500 g, about 100 µg to about 500 g, about 500 µg to about 500 g, about 1 g to about 500 g, about 50 g to about 500 g, about 100 g to about 500 g, about 250 g to about 500 g, about 1 µg to about 250 g, about 10 µg to about 250 g, about 50 µg to about 250 g, about 100 µg to about 250 g, about 250 µg to about 250 g, about 500 Hz to about 250 g, about 1 g to about 250 g, about 50 g to about 250 g, about 100 g to about 250 g, about 200 g to about 250 g, about 1 µg to about 100 g, about 10 µg to about 100 g, about 50 µg to about 100 g, about 100 µg to about 100 g, about 250 µg to about 100 g, about 500 µg to about 100 g about 1 g to about 100 g, about 50 g to about 100 g, about 1 µg to about 50 g, about 10 µg to about 50 g, about 50 µg to about 50 g, about 100 µg to about 50 g, about 250 µg to about 50 g, about 500 µg to about 50 g, about 1 g to about 50 g, about 1 µg to about 20 g, about 10 µg to about 20 g, about 50 µg to about 20 g, about 100 µg to about 20 g, about 250 µg to about 20 g, about 500 µg to about 20 g, about 1 g to about 20 g, about 5 g to about 20 g, about 10 g to about 20 g, about 1 µg to about 10 g, about 10 µg to about 10 g, about 50 µg to about 10 g, about 100 µg to about 10 g, about 250 µg to about 10 g, about 1 g to about 10 g, about 2 g to about 10 g, about 5 g to about 10 g, about 1g to about 5 g per hectare, or any value or range therein.

In some embodiments, administration of at least one dicarboxylic acid, and/or a salt thereof (e.g., second composition or synergistic composition) to an area comprising the plant and/or part thereof may be in an amount of about 10 µg, 15 µg, 20 µg, 25 µg, 30 µg, 35 µg, 40 µg, 50 µg, 55 µg, 60 µg, 65 µg, 70 µg, 75 µg, 80 µg, 85 µg, 90 µg, 95 µg, 100 µg, 200 µg, 300 µg, 400 µg, 500 µg, 600 µg, 700 µg, 800 µg, 900 µg, 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 21 g, 22 g, 23 g, 24 g, 25 g, 30 g, 35 g, 40 g, 50 g, 55 g, 60 g, 65 g, 70 g, 75 g, 80 µg, 85 g, 90 g, 95 g, 100 g, 200 g, 300 g, 400 g, 500 g, 600 g, 700 g, 800 g, 900 g, 1000 g per hectare, and/or any value or range therein.

In some embodiments, a first composition of the invention may comprise at least one aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, in an amount of about 0.1% to about 99.9%, about 0.5% to about 99.5%, about 5% to about 95%, about 5% to about 80%, about 10% to about 75% by weight of active components in the composition.

In some embodiments, a second composition of the invention may comprise at least one dicarboxylic acid in an amount of about 0.1% to about 99.9%, about 0.5% to about 99.5%, about 5% to about 95%, about 5% to about 80%, about 10% to about 75% by weight of active components in the composition. In some embodiments, a synergistic composition of the invention may comprise at least one aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, in an amount of about 0.1% to about 99.9%, about 0.5% to about 99.5%, about 5% to about 95%, about 5% to about 80%, about 10% to about 75% by weight of active components in the composition and at least one dicarboxylic acid in an amount of about 0.1% to about 99.9%, about 0.5% to about 99.5%, about 5% to about 95%, about 5% to about 80%, about 10% to about 75% by weight of active components in the composition.

In some embodiments, the ratio of the first composition to the second composition may be in the range of about 1:1 to about $1:1 \times 10^{-9}$ or about $1 \times 10^{-9}:1$ to about 1:1. In some embodiments, the ratio of the first composition to the second composition may be in the range of about 1:1, 1:2, 1:3, 1:4, 1:5, 1:6, 1:7, 1:8, 1:9, 1:10, 1:15, 1:20, 1:25, 1:30, 1:35, 1:40, 1:50, 2:1, 3:1, 4:1, 5:1, 6:1, 7:1, 8:1, 9:1, 10:1, 15:1; 20:1, 25:1, 30:1, 35:1, 40:1, 45:1, 50:1, and the like, and/or any range or value therein.

In some embodiments, the ratio of the at least one aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, to the at least one dicarboxylic acid in a synergistic composition of the invention may be in the range of about 1:1 to $1:1 \times 10^{-9}$ or $1 \times 10^{-9}:1$ to about 1:1. In some embodiments, the ratio of the at least one aminoguanidine, L-nitroarginine, L-nitroarginine methyl ester, 2,2'-bipyridine, 4-methylpyrazole, 8-hydroxyquiniline, caprylic acid, pyrazole, naringenin, kaempferol, quercetin, dodecanoic acid, and/or undecanoic acid, and/or a salt thereof, to the at least one dicarboxylic acid in a synergistic composition of the invention may be may be in the range of about 1:1, 1:2, 1:3, 1:4, 1:5, 1:6, 1:7, 1:8, 1:9, 1:10, 1:15, 1:20, 1:25, 1:30, 1:35, 1:40, 1:50, 2:1, 3:1, 4:1, 5:1, 6:1, 7:1, 8:1, 9:1, 10:1, 15:1; 20:1, 25:1, 30:1, 35:1, 40:1, 45:1, 50:1, and the like, and/or any range or value therein.

In some embodiments, a composition(s) of the invention (e.g., a first composition, a second composition, and/or a synergistic composition) may further comprise one or more additional active components.

In some embodiments, one or more additional active component may be provided in one or more than one composition that is/are separate from a composition(s) of the invention (e.g., the first and second compositions, the synergistic composition). Thus, in some embodiments, methods of the invention may further comprise contacting the plant and/or part thereof with one or more additional active components separately from the compositions of the invention. When provided in one or more than one separate composition(s), the additional active components may be contacted with a plant and/or part thereof, before, concurrent with, and/or within a few minutes (e.g., 1, 2, 3, 4, 5, 6, 7, 8, 9, 10, 15, 20, 30, 40, 50 minutes or more), hours (e.g., 1, 2, 3, 4, 5, 6, 7, 8, 9, 10, 11, 12, 13, 14, 15 hours or more) several hours (e.g, 6, 7, 8, 9, 10, 11, 12, 13, 14, 15, 16, 17, 18, 19, 20, 21, 22, 23, 24 hours or more hours), days (e.g., 1, 2, 3, 4, 5, 6, 7, 8, 9, 10 days or more) and/or weeks (e.g., 1, 2, 3, 4, 5, 6, 7, 8, 9, 10 weeks or more) before and/or after contacting a composition of this invention to the plant and/or part thereof.

Non-limiting examples of additional active components include furanocoumarin, terpene, tripene, pinene, 2-carene, phellandrene, rosmarinic acid, benzyl acetate, a plant hormone, a growth regulator, an auxin transport inhibitor, an amino acid, a fertilizer, a nutrient, a micronutrient, a terpene, a pesticide, a fungicide, a nematicide, reflective material, or any combination thereof.

Plant hormones may include, but are not limited to, auxin, cytokinin, abscisic acid, gibberellin, ethylene, salicylic acid, brassinosteriod (e.g., brassinolide), or any combination thereof. A non-limiting example of a growth regulator may include napthelene acetic acid (NAA) and/or indole-3-butyric acid, and/or a combination thereof.

In some embodiments, a composition of the invention may include an active component that is an amino acid, wherein the amino acid may be glycine betaine, aminobutyric acid, and/or any combination thereof. In some embodiments, a composition of the invention may include salicylic acid. In some embodiments, a composition of the invention may include salicylic acid and glycine betaine.

In some embodiments, a composition of the invention may comprise a reflective material such as, for example, kaolin. In some embodiments, a composition of the invention may further comprise calcium carbonate. Thus, in some embodiments of this invention, a composition of the invention may comprise kaolin and/or calcium carbonate, and/or combinations thereof.

In some embodiments, a composition of the invention that further comprises additional active components may comprise each additional active ingredient in an amount of between about 0.00001 gram to about 1000 grams active ingredient per hectare. Thus, in some embodiments, the amount of each additional active ingredient can be between about 0.0001 gram to about 750 grams per hectare, about 0.001 gram to about 500 grams active ingredient per hectare, about 0.005 gram to about 250 grams active ingredient per hectare, about 0.01 gram to about 100 grams active ingredient per hectare, about 0.5 gram to about 50 grams active ingredient per hectare, or about 1 gram to about 25 grams active ingredient per hectare. In some embodiments, the amount of each additional active ingredient in a composition (e.g., a first composition, a second composition, a synergistic composition, or a separate composition) may be about 0.1, 0.25, 0.5, 1, 2, 3, 4, 5, 6, 7, 8, 9, 10, 11, 12, 13, 14, 15, 16, 17, 18, 19, 20, 21, 22, 23, 24, 25, 30, 35, 40, 45, 50 grams active ingredient per hectare, and the like, and/or any range or value therein.

In some embodiments, a composition may further comprise an amount kaolin in a range from bout 5 kg/ha to about 100 kg/ha. Thus, in some embodiments, the amount of kaolin can be in a range from about 5 kg/ha to about 10 kg/ha, about 5 kg/ha to about 15 kg/ha, about 5 kg/ha to about 20 kg/ha, about 5 kg/ha to about 30 kg/ha, about 5 kg/ha to about 40 kg/ha, about 5 kg/ha to about 50 kg/ha, about 5 kg/ha to about 60 kg/ha, about 5 kg/ha to about 70 kg/ha, about 5 kg/ha to about 80 kg/ha, about 5 kg/ha to about 90 kg/ha, about 15 kg/ha to about 30 kg/ha, about 15 kg/ha to about 40 kg/ha, about 15 kg/ha to about 50 kg/ha, about 15 kg/ha to about 60 kg/ha, about 15 kg/ha to about 80 kg/ha, about 15 kg/ha to about 90 kg/ha, about 15 kg/ha to about 100 kg/ha, about 20 kg/ha to about 50 kg/ha, about 20 kg/ha to about 80 kg/ha, about 20 kg/ha to about 100 kg/ha, about 40 kg/ha to about 80 kg/ha, about 40 kg/ha to about 100 kg/ha, about 50 kg/ha to about 80 kg/ha, about 50 kg/ha to about 100 kg/ha, about 50 kg/ha to about 100 kg/ha, about 75 kg/ha to about 100 kg/ha, and the like, and/or any range or value therein.

As discussed above, a plant and/or part thereof that is contacted with a composition of the invention may be contacted with other compounds that are comprised in the same composition/formulation (as that of the invention; e.g., first, second and/or synergistic) or may be in separate compositions/formulations. Thus, the kaolin and/or calcium carbonate, and the like, or combinations thereof, can be in the same composition/formulation with a composition of the invention (e.g., first and second composition and/or synergistic composition) or can be provided in one or more than one (e.g., one, two, three, four, five, six, seven, eight, nine, ten, eleven, twelve, thirteen, fourteen, fifteen, etc) separate compositions/formulations. When provided in separate compositions/formulations, the plant and part thereof can be contacted with the first and second compositions or synergistic compositions before, concurrent with, and/or after, the plant and/or part thereof is contacted with the reflective compounds (e.g., kaolin, calcium carbonate).

Thus, in some embodiments, the plant and/or part thereof that is contacted with a composition(s) of the present invention may be contacted with one or more than one useful compound (e.g., additional active components) present in one or more than one composition separate from the composition(s) of the invention (e.g., first and second composition and/or synergistic composition). As discussed herein, the order of application of the compositions can vary according to need.

In some embodiments, a composition of the invention (e.g., a first composition, a second composition, and/or a synergistic composition) may further comprise an agriculturally acceptable carrier. An agriculturally-acceptable carrier of the present invention can include natural or synthetic, organic or inorganic material which is combined with the active component to facilitate its application to the plant, or part thereof. In some embodiments, an agriculturally-acceptable carrier of the present invention can include, but is not limited to, a support, filler, dispersant, emulsifier, wetter, adjuvant, solubilizer, colorant, tackifier, binder, anti-foaming agent and/or surfactant, or combinations thereof, that can be used in agricultural formulations.

Agriculturally acceptable carriers can be solid or liquid and are well known to those of skill in the art. Solid carriers include, but are not limited to, silicas, silica gels, silicates, talc, kaolin, limestone, lime, chalk, bole, loess, clay, dolomite, attapulgite clay, bentonite, acid clay, pyrophillite, talc, calcite, corn starch powder, dolomite, diatomaceous earth, calcium sulfate, magnesium sulfate, magnesium oxide, ground synthetic materials, resins, waxes, polysaccharides, e.g. cellulose, starch, fertilizers such as ammonium sulfate, ammonium phosphate, ammonium nitrate and ureas, products of vegetable origin such as cereal meal, tree bark meal, wood meal and nutshell meal (e.g., walnut shell powder), cellulose powders and the like; and combinations thereof. Non-limiting examples of liquid carriers include water, alcohols, ketones, petroleum fractions, aromatic or paraffinic hydrocarbons, chlorinated hydrocarbons, liquefied gases and the like, and combinations thereof. Thus, liquid carriers can include, but are not limited to, xylene, methylnaphthalene and the like, isopropanol, ethylene glycol, cellosolve and the like, acetone, cyclohexanone, isophorone and the like, vegetable oils such as soybean oil, cottonseed oil, corn oil and the like, dimethyl sulfoxide, acetonitrile, and combinations thereof.

In some embodiments, an agriculturally acceptable carrier of the present invention comprises a surface active agent (surfactant), which can be an emulsifying, dispersing or wetting agent of ionic or nonionic type. Non-limiting examples of surface active agents suitable for use with the compositions of the present invention, include alkyl benzene and alkyl naphthalene sulfonates, alkyl and alkyl aryl sulfonates, alkyl amine oxides, alkyl and alkyl aryl phosphate esters, organosilicones, fluoro-organic wetting agents, alcohol ethoxylates, alkoxylated amines, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylenic glycols, block copolymers, polyoxyalkylene derivatives of alkylphenols (particularly isooctylphenol and nonylphenol) and polyoxyalkylene derivatives of the mono-higher fatty acid esters of hexitol anhydrides (e.g., sorbitan).

Examples of surfactants are provided in McCutcheon's, Vol. 1: Emulsifiers and Detergents, McCutcheon's Directories, Glen Rock, USA, 2008 (International Ed. or North American Ed.). Non-ionic surface active agents useful with the compositions of this invention can include, but are not limited to, polyglycol ether derivatives of aliphatic or cycloaliphatic alcohols, saturated or non-saturated fatty acids and alkylphenols, which have 3 to 10 glycol ether groups and 8 to 20 carbon atoms in the (aliphatic) hydrocarbon residue and 6 to 18 carbon atoms in the alkyl residue of the alkyl phenols. Other non-limiting examples of suitable non-ionic surface active agents include the water-soluble, 20 to 200 ethylene glycol ether groups containing polyadducts of ethylene oxide and polypropylene glycol, ethylene diamino polypropylene glycol and alkyl polypropylene glycol with 1 to 10 carbon atoms in the alkyl moiety. Additional non-limiting examples of non-ionic surface active agents include nonylphenol polyethoxy ethanols, castor oil polyglycol ether, fatty acid esters of polyoxy ethylene sorbitan, such as polyoxy ethylene sorbitan trioleate, polyadducts of ethylene oxide and polypropylene, tributyl phenoxy polyethoxy ethanol, polyethylene glycol, octyl phenoxy polyethoxy ethanol, Tween serials such as polyoxyethylene sorbitan monolaurate, polyoxyethylene sorbitan monopalmitate, polyoxyethylene sorbitan monooleate, and the like.

Non-limiting examples of dispersants useful with the compositions of the present invention include methyl, cellulose, polyvinyl alcohol, sodium lignin sulfonates, calcium lignosulfonates, polymeric alkyl naphthalene sulfonates, sodium naphthalene sulfonate, polymethylene binaphthalene sulfonate, neutralized polyoxyethylated derivatives and/or ring-substituted alkyl phenol phosphates. In additional embodiments of this invention, the compositions of the invention may further comprise stabilizers, such as magnesium aluminum silicate, xanthan gum and the like.

Accordingly, in some embodiments, the compositions of the invention may be mixed with one or more agriculturally acceptable carriers, solid or liquid, and prepared by various means, e.g., by homogeneously mixing, blending and/or grinding the composition(s) with suitable carriers using conventional formulation techniques. The compositions of the present invention can be made in any formulation suitable for applying to or contacting with a plant and/or part thereof. Formulations suitable for contacting the compositions of the invention to a plant and/or part thereof include, but are not limited to, a spray, a suspension, a powder, a granule, a tablet, an extruded granule, a mist, an aerosol, a foam, paste, emulsions (e.g., in oil (vegetable or mineral), or water or oil/water), a capsule, and combinations thereof.

Powders and dusts may be prepared by mixing or jointly grinding the active compound or compounds with a solid carrier. Granules (e.g. coated granules, impregnated granules or homogeneous granules) may be prepared by binding the active component to a solid carrier. Solutions may be prepared by dissolving the active component in a liquid carrier, optionally including a surface active agent.

The frequency of contacting a plant and/or part thereof with a composition of the invention (a first composition, a second composition, a synergistic composition) can be as often as necessary to impart the desired effect of increasing tolerance to abiotic stress, and/or reducing the consequence of abiotic stress. For example, the composition may be contacted with the plant and/or part thereof one, two, three, four, five, six, seven, or more times per day, one, two, three, four, five, six, seven, eight, nine, ten, or more times per week, one, two, three, four, five, six, seven, eight, nine, ten, or more times per month, and/or one, two, three, four, five, six, seven, eight, nine, ten, or more times per year, as necessary to achieve increased tolerance to abiotic stress. Thus, in some embodiments, a composition of the invention may be contacted with a plant and/or part thereof 1 to 10 times per season, 1 to 11 times per season, 1 to 12 times per season, 1 to 13 times per season, 1 to 14 times per season, 1 to 15 times per season, and the like. In some embodiments, number of days between applications of (i.e., contacting the plant and/or part thereof with) the dicarboxylic acid and/or derivatives thereof may be 1 day to 100 days, 1 day to 95 days, 1 day to 90 days, 1 day to 85 days, 1 day to 80 days, 1 day to 75 days, 1 day to 70 days, 1 day to 65 days, 1 day to 60 days, 1 day to 55 days, 1 day to 50 days, 1 day to 45 days, 1 day to 40 days, and the like, and any combination thereof. In still other embodiments of the present invention, the number of days between applications of any of the compositions of the invention may be 1 day, 4 days, 7 days, 10 days, 13 days, 15 days, 18 days, 20 days, 25, days, 28, days, 30 days, 32, days, 35 days, 38 days, 40 days, 45 days, and the like, and any combination thereof. Accordingly, as one of skill in the art would recognize, the amount and frequency of application or contacting of the compositions of the invention to a plant and/or part thereof will vary depending on the plant/crop type, the condition of the plant/crop, the abiotic stress or consequences thereof being alleviated and the like. As one of skill in the art would additionally recognize based on the description provided herein, a composition of the invention can be effective for increasing tolerance to abiotic stress and/or reducing the consequence of abiotic stress in a plant and/or part thereof regardless of whether the initial application of the composition of the present invention is applied to the plant prior to, during, and/or after the initiation of the abiotic stress(es).

Accordingly, a plant and/or part thereof may be contacted with a composition of the invention more than once (e.g., 2, 3, 4, 5, 6, 7, 8, 9, 10, or more times) and/or with more than one composition (e.g., the first and second composition of the invention, and/or the synergistic composition) simultaneously, consecutively and/or intermittently, and/or in any order and/or in any combination.

In some embodiments, a plant and/or part thereof may be contacted with a first composition of the invention and second composition of the invention one or more times (e.g., 1, 2, 3, 4, 5, 6, 7, 8, 9, 10, or more times) simultaneously as two separate compositions or in a single composition. In some embodiments, the plant and/or part thereof may be contacted with the first composition of the invention and second composition of the invention at least twice (e.g., 2, 3, 4, 5, 6, 7, 8, 9, 10, or more times).

In some embodiments, the plant and/or part thereof may be contacted with a first composition of the invention and second composition of the invention separately one or more times (e.g., 1, 2, 3, 4, 5, 6, 7, 8, 9, 10, or more times) and in any order. In some embodiments, the plant and/or part thereof may be contacted with the first composition of the invention and second composition of the invention sequentially beginning with the first composition or beginning with the second composition. In some embodiments, the plant and/or part thereof may be contacted with the first composition of the invention before being contacted with the second composition of the invention. In some embodiments, the plant and/or part thereof may be contacted with the first composition of the invention after being contacted with the second composition of the invention. In some embodiments, the plant and/or part thereof may be contacted with the first composition of the invention before and after being contacted with the second composition of the invention. In some embodiments, the plant and/or part thereof may be contacted with the second composition before and after being contacted with the first composition.

In some embodiments, a plant and/or part thereof is may be contacted with the first composition at least two times (e.g., 2, 3, 4, 5, 6, 7, 8, 9, 10, or more times) prior to being contacted with the second composition. In some embodiments, the plant and/or part thereof may be contacted with the second composition at least two times (e.g., 2, 3, 4, 5, 6, 7, 8, 9, 10, or more times) prior to being contacted with the first composition.

In some embodiments, a plant and/or part thereof may be contacted with a first composition of the invention and a second composition of the invention during different stages of development of the plant and/or plant part. Non-limiting examples of different stages of development may include a seed, seedling, adult or mature plant, budding plant, flowering plant, and/or fruiting plant. Thus, for example, a plant may be contacted at a seedling stage with a first composition and at the fruiting stage with a second composition or a seed may be treated with the compositions of the invention and then the flowers or fruit of the plant grown from the seed may be treated (e.g., several months later depending on the plant species; e.g., up to about 3 months between the seed treatment and the late reproductive stage for, for example, corn or soybean).

Thus, for example, a part of a plant may be a seed and the seed may be contacted with a first composition of the invention and with a second composition of the invention, at least once each (e.g., 1, 2, 3, 4, 5, 6, 7, 8, 9, 10, or more times) and in any order. In some embodiments, a plant may be germinated from the seed that has been contacted. In some embodiments, the plant/seedling that is germinated from the seed (which has been so contacted) may be contacted with the first composition and the second composition at least once each and in any order. In some embodiments, a plant may be contacted with a first composition of the invention and a second composition of the invention at least once each and in any order and then a part (e.g., a seed, flower, fruit and the like) of the plant (which has been so contacted) may be contacted with the first composition and the second composition at least once each and in any order.

In some embodiments, a plant and/or part thereof may be contacted with a synergistic composition of the invention one or more times. In some embodiments, the plant and/or part thereof may be contacted with a synergistic composition of the invention at least twice (e.g., 2, 3, 4, 5, 6, 7, 8, 9, 10, or more times) and the time between contacting the plant or plant part thereof with the synergistic composition and subsequently or again contacting the plant or plant part thereof with the synergistic composition may be up to 10 days, up to 11 days, up to 12 days, up to 13 days and/or up to 14 days.

In some embodiments, a plant and/or part thereof is may be contacted with a synergistic composition of the invention more than once (e.g., 2, 3, 4, 5, 6, 7, 8, 9, 10, or more times) and during different stages of development of the plant and/or plant part. Non-limiting examples of different stages of development may include a seed, seedling, adult or mature plant, budding plant, flowering plant, and/or fruiting plant.

Accordingly, in some embodiments, a part of a plant may be a seed and the seed may be contacted with a synergistic composition of the invention at least once (e.g., 1, 2, 3, 4, 5, 6, 7, 8, 9, 10, or more times) and the seed that has been contacted with the synergistic composition of the invention may germinate to produce a plant/seedling. In some embodiments, the plant/seedling germinated from the seed that has been so contacted may be contacted with the synergistic composition at least once and in any order. In some embodiments, a plant may be contacted with a synergistic composition of the invention at least once and in any order, and subsequently a part of that plant (e.g., a seed, flower, fruit and the like) may be contacted with the synergistic composition at least once and in any order.

As an example, an application to a maize or soybean plant may be made between the v2 (2 leaf) and V6 (six leaf) stage of growth. In a tomato plant, applications may begin pre-transplant and continue at two to three week intervals through early harvest. In citrus, applications may begin prior to flowering and continue at three to four week intervals for six or seven applications.

As discussed above, abiotic stress includes, but is not limited to, cold temperature, freezing, chilling, heat or high temperature, drought, high light intensity, salinity, ozone, and/or combinations thereof. In some particular embodiments of the present invention, the abiotic stress is freezing. In other aspects of the invention, the abiotic stress is chilling In still other aspects of the invention, the abiotic stress is high light intensity. In additional embodiments of the invention, the abiotic stress is high temperature. As one of skill in the art would recognize, at any one time, a plant may be exposed to one or more abiotic stresses. (Mittler, R., *Trends Plant Sci.* 11(1) (2006)). Thus, in some embodiments of the invention, the term abiotic stress refers to a combination of stresses. Such combinations of stresses include, but are not limited to, high light intensity and high temperature; high light intensity and drought; high light intensity and salinity; high temperature and salinity; drought and high temperature; high light intensity and cold temperature; high light intensity, high temperature, and drought; high light intensity, high temperature, and salinity; and the like. In some particular embodiments, a combination of abiotic stresses may be high temperature and high light intensity. In some embodiments, a combination of abiotic stresses may be high temperature, high light intensity and drought. In some embodiments, a combination of abiotic stresses may be high temperature and drought. In some embodiments, a combination of abiotic stresses may be high light intensity and drought or cold temperature (or chilling) and high light intensity.

A plant and/or part thereof exposed to high temperature, alone or in combination with high light intensity can develop sunburn. Sunburn damage is a significant problem in the fruit industry resulting in losses in the millions of dollars. Three types of sunburn on fruit have been identified in, for example, apple studies. The first type is a necrotic spot on the sun-exposed side of the fruit resulting from the thermal death of cells in the peel when the surface temperature of the fruit reaches about 126° F. High temperature alone is sufficient to induce this condition. The second type is called "sunburn browning" and results in a yellow, bronze, or brown spot on the sun-exposed side of the fruit. This type of damage occurs in apples at a fruit surface temperature from about 115° F. to 120° F. and requires the presence of sunlight. The threshold temperature required for sunburn browning is cultivar dependent.

The third type of sunburn damage occurs on fruit that is suddenly exposed to full sunlight, for instance, after thinning of tree branches or shifting of a branch as fruit load increases. This type of sunburn requires light and relatively low ambient temperatures (e.g., about 65° F.) with fruit surface temperature of about 88° F. Heat stress can also induce or enhance several skin and/or fruit disorders, including lenticel marking (dark spots), sunburn scald, cracking/splitting, misshapen fruit, bitter pit (blotchiness), "Fuji stain," and watercore. Sunburned/heat stressed tissues can also serve as entrance points for fungi and other pathogens. (See, U.S. Patent Application Publication No. 20090280985)

Thus, in some embodiments, the present invention provides methods of increasing tolerance to high temperature in a plant and/or part thereof comprising contacting the plant and/or part thereof with a composition of the invention (i.e., a first and a second composition of the invention and/or a synergistic composition of the invention), thereby increasing the tolerance of the plant and/or part thereof to high temperature and reducing sunburn damage as compared to a control (i.e., a plant and/or part thereof exposed to the same abiotic stress (i.e., high temperatures) but which has not been contacted with the composition(s) of the present invention). In some embodiments, a method is provided for increasing tolerance to high temperature and high light intensity in a plant and/or part thereof comprising contacting the plant and/or part thereof with a composition(s) of the invention, thereby increasing the tolerance of the plant or plant part to high temperature and high light intensity and reducing sunburn damage as compared to a control.

In some embodiments, a method is provided for increasing tolerance to high temperature, high light intensity and drought in a plant and/or part thereof comprising contacting the plant and/or part thereof with a composition(s) of the invention (i.e., a first and a second composition of the invention and/or a synergistic composition of the invention), thereby increasing the tolerance of the plant and/or part thereof to high temperature, high light intensity and drought as compared to a control. In some embodiments, a method is provided for increasing tolerance to high temperature and drought in a plant and/or part thereof comprising contacting the plant and/or part thereof with a composition(s) of the invention, thereby increasing the tolerance to high temperature and drought as compared to a control. In some embodiments, a method is provided for increasing tolerance to high light intensity and drought in a plant and/or part thereof comprising contacting the plant and/or part thereof with a composition(s) of the invention, thereby increasing the tolerance to high light intensity and drought as compared to a control. In still further embodiments, a method is provided for increasing tolerance to drought in a plant and/or part thereof comprising contacting the plant and/or part thereof with a composition(s) of the invention, thereby increasing the tolerance to drought as compared to a control.

Abiotic stress such as high temperature can result in crop losses due to flower-abortion or fruit drop. Thus, in some embodiments of the invention, methods are provided for increasing tolerance to high temperature in a plant and/or part thereof comprising contacting the plant and/or part thereof with a composition(s) of the invention (i.e., a first and a second composition of the invention and/or a synergistic composition of the invention), thereby increasing the tolerance of the plant and/or part thereof to high temperature and reducing floral abortion as compared to a control (i.e., a plant and/or part thereof which has been exposed to the same abiotic stress conditions but has not been contacted with the composition(s) of the invention). In some embodiments, methods are provided for increasing tolerance to high temperature in a plant and/or part thereof comprising contacting the plant and/or part thereof with a composition(s) of the invention, thereby increasing the tolerance of the plant and/or part thereof to high temperature and reducing fruit drop as compared to a control.

Cell division and/or fruit size can be affected by abiotic stress including high temperature, high light intensity and/or drought. Each of these abiotic stress factors, alone or in combination, can result in reduced cell division and/or reduced fruit size. Thus, in some embodiments, the present invention provides methods for increasing tolerance to high temperature and/or high light intensity and/or drought in a plant and/or part thereof comprising contacting the plant and/or part thereof with a composition(s) of the invention (i.e., a first and a second composition of the invention and/or a synergistic composition of the invention), thereby increasing the tolerance of the plant and/or part thereof to high temperature and/or high light intensity and/or drought and maintaining cell division and/or fruit size as compared to a control. In some embodiments, the present invention provides methods for increasing tolerance to high temperature in a plant and/or part thereof comprising contacting the plant and/or part thereof with a composition(s) of the invention, thereby increasing the tolerance of the plant and/or part thereof to high temperature and maintaining cell division and/or fruit size as compared to a control.

The number and/or size of plants or parts thereof and the quality of the plant or plant part thereof that is produced (e.g., fruit quality) may also be affected by abiotic stress. Thus, depending on the abiotic stress that a plant is exposed to the plant or plant part thereof can be reduced in the size and/or the number of plants or parts thereof can be reduced, and/or the quality of the produced plant and/or part thereof can be reduced (e.g., fruit size and/or quality). Quality can be measured as color, finish, and/or shape (e.g., reduced quality of produce due to appearance and texture). Thus, in some embodiments, the present invention provides methods for increasing tolerance to abiotic stress in a plant and/or part thereof comprising contacting the plant and/or part thereof with a composition(s) of the invention, thereby increasing the tolerance of the plant and/or part thereof to abiotic stress and maintaining the number and/or size of a plant and/or part thereof as compared to a control. In some embodiments, the present invention provides methods for increasing tolerance to abiotic stress in a plant and/or part thereof comprising contacting the plant and/or part thereof with a composition(s) of the invention, thereby increasing the tolerance of the plant and/or part thereof to abiotic stress and maintaining the quality of a plant and/or part thereof of as compared to a control.

In some aspects of the invention, "contacting" a plant and/or part thereof includes any method by which a composition(s) of the invention is brought into contact with the plant and/or part thereof. The term "contact" comprises any method in which a plant is exposed to, provided with, or in which a compound is applied to a plant and/or part thereof. Some non-limiting examples of contacting a plant and/or part thereof include spraying, dusting, sprinkling, scattering, misting, atomizing, broadcasting, soaking, soil injection, soil incorporation, drenching (e.g., soil treatment), pouring, coating, leaf or stem infiltration, side dressing or seed treatment, and the like, and combinations thereof. These and other procedures for contacting a plant and/or part thereof with compound(s), composition(s) or formulation(s) are well-known to those of skill in the art.

As used herein, the surface of the plant and part thereof includes the plant and parts thereof that are above and below the ground. In some particular embodiments of this invention, the composition is contacted with/applied to a surface of the plant or plant part, and the composition may then absorbed into the plant.

Thus, a plant and/or part thereof of the present invention includes, but is not limited to, the whole plant, the above and below ground parts of the plant, leaves, needles, stems, buds, flowers and parts thereof, fruits and parts thereof, cones and parts thereof, stems, seeds, roots, tubers, rhizomes, and combinations thereof. A whole plant includes all stages of development from seed and seedling to mature plant. Thus, in some embodiments of the invention, the plant is a seed. In other embodiments of the invention, the plant is a seedling. In still other embodiments, the plant is mature and can bear flowers and fruit (i.e., sexually reproduce). A plant may be contacted with a composition(s) of the present invention at all stages of plant development. As would be well understood in the art, the stage or stages of development during which a composition(s) of the present invention may be contacted with the composition(s) of the present invention would depend upon the species of plant, the plant part and the stress to which the plant and/or part thereof is exposed. In some particular aspects of the invention, the stage of development at which a plant is contacted with a composition(s) of the invention is at petal fall.

The methods of the present invention are useful for any type of plant and/or part thereof exposed to or which may become exposed to an abiotic stress. Thus, plants useful for the present invention include, but are not limited to, gymnosperms, angiosperms (monocots and dicots), ferns, fern allies, bryophytes, and combinations thereof.

Non-limiting examples of types of plants useful with this invention include woody, herbaceous, horticultural, agricultural, forestry, nursery, ornamental plant species and plant species useful in the production of biofuels, and combinations thereof. In some embodiments, a plant and/or part thereof useful with the invention includes, but is not limited to, arabidopsis, apple, tomato, pear, pepper (Capsicum), bean (e.g., green and dried), cucurbits (e.g., squash, cucumber, honeydew melon, watermelon, cantaloupe, and the like), papaya, mango, pineapple, avocado, stone fruits (e.g., plum, cherry, peach, apricot, nectarine, and the like), grape (wine and table), strawberry, raspberry, blueberry, mango, cranberry, gooseberry, banana, fig, citrus (e.g., clementine, kumquat, orange, grapefruit, tangerine, mandarin, lemon, lime, and the like), nuts (e.g., hazelnut, pistachio, walnut, macadamia, almond, pecan, and the like), lychee (Litchi), soybeans, corn, sugar cane, camelina, peanuts, cotton, canola, oilseed rape, sunflower, rapeseed, alfalfa, timothy, tobacco, tomato, sugarbeet, potato, pea, carrot, cereals (e.g., wheat, rice, barley, rye, millet, sorghum, oat, triticale, and the like), buckwheat, quinoa, turf, lettuce, roses, tulips, violets, basil, oil palm, elm, ash, oak, maple, fir, spruce, cedar, pine, birch, cypress, coffee, miscanthus, arundo, switchgrass, and combinations thereof.

Thus, in some embodiments of the present invention, the plant and/or part thereof is a tomato. In other embodiments, the plant and/or part thereof is a citrus tree. In still other embodiments, the plant and/or part thereof is an apple tree. In further embodiments, the plant and/or part thereof is a stonefruit. In still further embodiments, the plant and/or part thereof is a wine grape plant.

Other aspects of the invention comprise the use of a compound of the invention or a composition of the present invention for carrying out the methods of the present invention described herein.

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLES

Example 1

Soybean Trial 2017

Four different treatments were applied to soybean plants in a field in Elm City, N.C. during the summer of 2017. A replicated complete block trial design was used and plants were treated at the 5-6 leaf stage (V5-6) by spray. The treatments were as follows: UTC (untreated control); PHOTON® (blend of dicarboxylic acids [suberic (4%), azelaic (85%), sebacic(4%), and undercanedioic (6%) acids] at 40 g/ha); CMM2017P (aminoguanidin—2 grams per hectare); and a combination of PHOTON® and CMM2017P. The combined treatment of plants with PHOTON® and CMM2017P was sequential. FIG. 1 provides results of the treatments and clearly demonstrates the synergistic effect of the aminoguanidine and dicarboxylic acids on soybean yields when the plants are under abiotic stress.

Example 2

Corn Trial 2017

Figure 2:
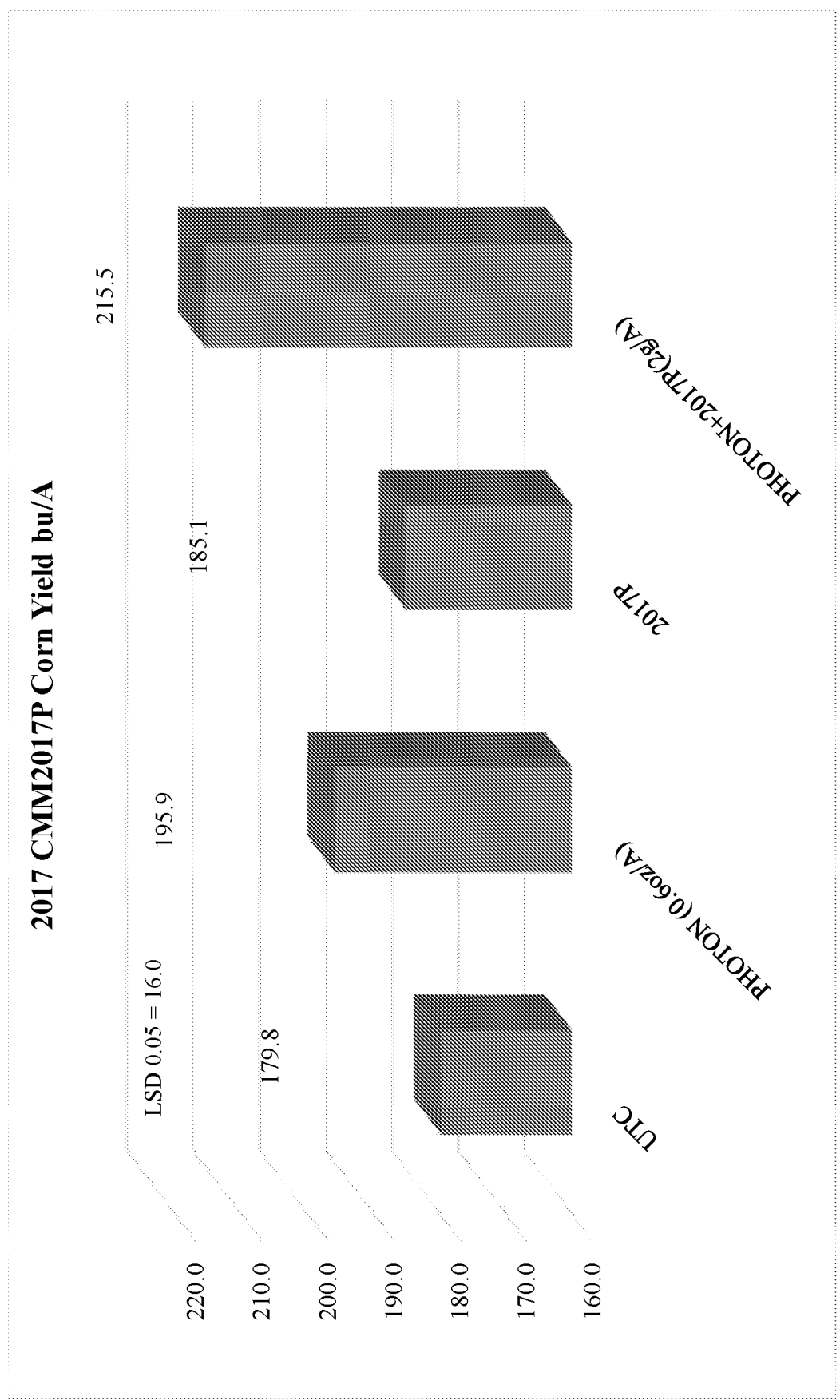
FIG. 2 provides a graphic representation of corn yields after application of various treatments to corn plants: UTC (untreated control); PHOTON® (blend of dicarboxylic acids); CMM2017P (aminoguanidine); and a combination of PHOTON® and CMM2017P.
Figure 3:
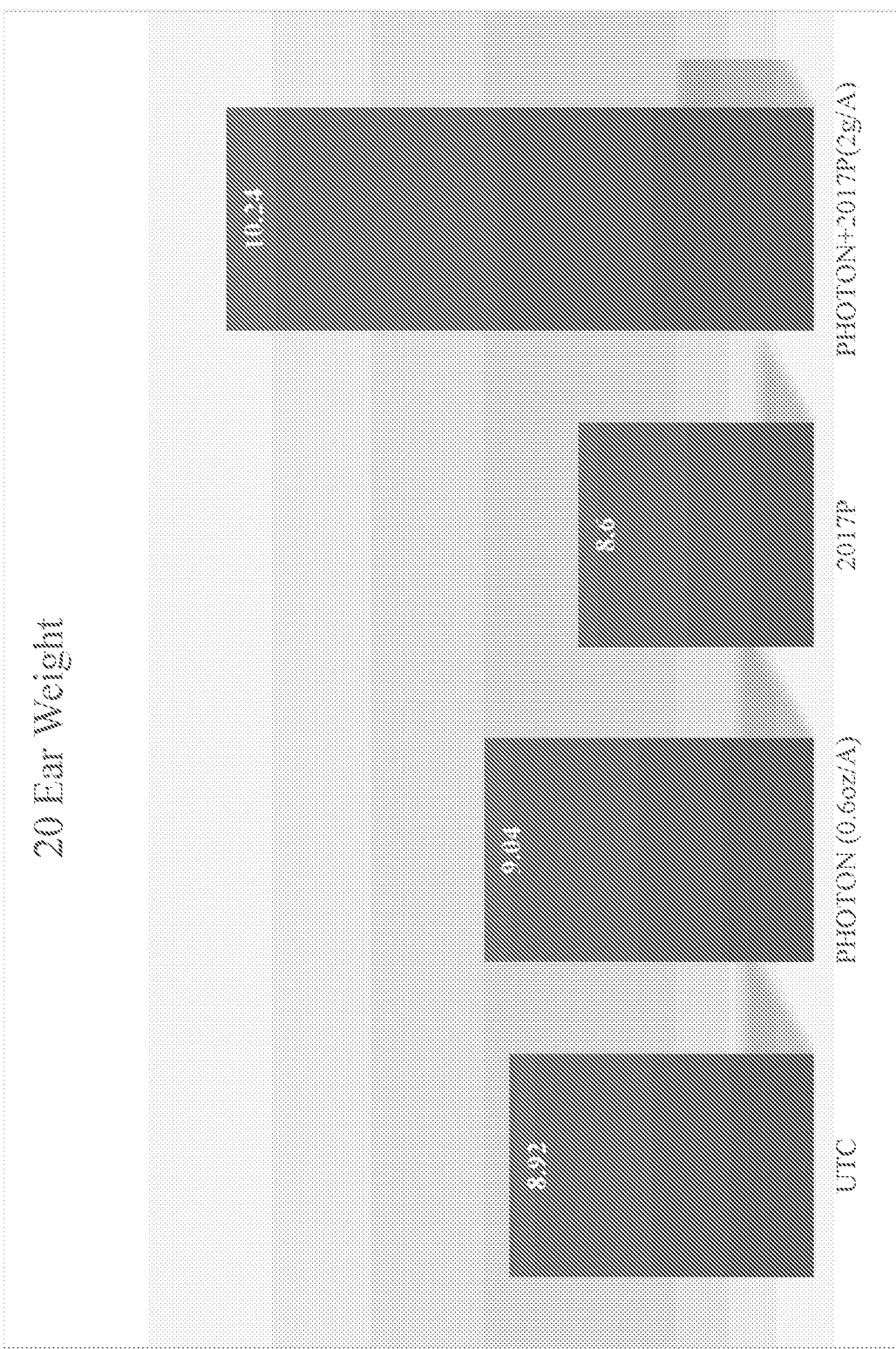
FIG. 3 provides a graphic representation of corn ear weight after application of various treatments to soybean plants: UTC (untreated control); PHOTON® (blend of dicarboxylic acids); 2017P (aminoguanidine); and a combination of PHOTON® and 2017P.

Four different treatments were applied to in a field in Elm City, N.C. during the summer of 2017. A replicated complete block trial design was used and plants were treated at the 5-6 leaf stage (V5-6) by spray. The treatments were as follows: UTC (untreated control); PHOTON® (blend of dicarboxylic acids [suberic (4%), azelaic (85%), sebacic(4%), and undecanedioic (6%) acids] at 40 g/ha); CMM2017P (aminoguanidine-2 grams per hectare); and a combination of PHOTON® and CMM2017P. The combined treatment of plants with PHOTON® and CMM2017P was sequential. FIG. 2 provides results of the treatments and clearly demonstrates the synergistic effect of the aminoguanidine and dicarboxylic acids on corn yields when the plants are under abiotic stress. In addition, a synergistic effect is observed for ear weight as shown in FIG. 3.

Example 3

Soybean Trial 2018

In the table below, the treatment labeled "Photon" represents a mixture of azelaic, sebacic, undecanedioic, acids. It is predominantly azelaic acid, and equal parts of the remaining two major constituents. Abbreviations: ai=active ingredient, A=acre, ha=hectare, lbs=pounds, MT=metric ton
Soybean Trial 2018
Elm City N.C.
Randomized complete block with 5 replicates

TABLE 1

Soybean

| Treatment | Rate | Yield (bu/A) |
|---|---|---|
| Control | | 22.3 |
| Photon | 8 g ai/A | 27.8 |
| Aminoguanidine | 2 g ai/A | 24.3 |
| Photon + Aminoguanidine | 8 g + 2 g ai/A | 30.6 |
| | LSD 0.05 | 3.8 |

TABLE 2

Soybean - Two Year Summary

| Treatment | Rate | Yield (bu/A) |
|---|---|---|
| Control | | 38.9 |
| Photon | 8 g ai/A | 44.1 |

TABLE 2-continued

Soybean - Two Year Summary

| Treatment | Rate | Yield (bu/A) |
|---|---|---|
| Aminoguanidine | 2 g ai/A | 42.5 |
| Photon + Aminoguanidine | 8 g + 2 g ai/A | 50.8 |
| | LSD 0.01 | 3.9 |

Example 4

Wheat Trial 2018

In Tables 3-6, below (Examples 4-7), the treatment labeled "Photon" represents a mixture of azelaic, sebacic, undecanedioic, acids. It is predominantly azelaic acid, and equal parts of the remaining two major constituents. Abbreviations: ai=active ingredient, A=acre, ha=hectare, lbs=pounds, MT=metric ton
Wheat Trial 2018
Elm City, N.C., Randomized Complete Block design with 4 replications
Applications made 28 Mar. 2018 at flag leaf stage of growth

TABLE 3

Wheat trial

| Treatment | Rate | Yield (lbs/plot) |
|---|---|---|
| Control | | 65.0 |
| Photon | 8 g ai/A | 72.3 |
| Photon + Aminoguanidine | 8 g + 2 g ai/A | 96.5 |

Example 5

Tomato Trial 2017-2018

Tomato Trial 2017-18
Rochester Victoria, Australia
Multiple application dates
Trial Randomized Complete Block with 5 replicates
Tomato CV H1307

TABLE 4

Tomato trial

| Treatment | Rate | Number Sunburn Fruit 19 days after 4th application | Yield Red Fruit (MT)/ha |
|---|---|---|---|
| Control | | 64.8 | 90.4 |
| Photon | 10 g ai/ha | 31.2 | 115.1 |
| Photon + aminoguanidine | 10 + 2 g ai/ha | 27.0 | 119.5 |

Example 6

Apple Trial 2018

Apple trial Shepparton East, Victoria, Australia
Randomized complete block with 4 replications
Var. Golden Smoothy

TABLE 5

| | | | Apple trial | | |
|---|---|---|---|---|---|
| | | | | Yield | |
| Treatment | Rate | Sunburn | % Fruit Commercial Grade | Commercial | Total |
| Control | | 26.2 | 73.1 | 32.5 | 41.4 |
| Photon | 18 g ai/ha | 13 | 84 | 40.6 | 45.3 |
| Photon + Aminoguanidine | 18 g + 2 g ai/ha | 10.2 | 86.3 | 42.8 | 47.2 |

Example 7

Tomato Trial 2018-2019

Tomato 2018-2019
Echuca, Victoria, Australia
Randomized complete block with 5 replicates

TABLE 6

| | Tomato trial | |
|---|---|---|
| Treatment | Rate | Aborted Flower Jan. 2, 2019 |
| Control | | 11.0 |
| Photon | 10 g ai/ha | 1.5 |
| Photon + Dodecanate | 10 g + 5 g ai/ha | 1.3 |
| Photon + Undecanate | 10 g + 5 g ai/ha | 1.0 |

The foregoing is illustrative of the present invention, and is not to be construed as limiting thereof. The invention is defined by the following claims, with equivalents of the claims to be included therein.

That which is claimed is:

1. A composition that synergistically increases tolerance to abiotic stress and/or reduces the consequence of abiotic stress in a plant and/or part thereof comprising:
   aminoguanidine-and/or a salt thereof; and
   at least one dicarboxylic acid and/or a salt thereof.

2. The composition of claim 1, wherein the amount of the aminoguanidine and/or a salt thereof in the composition is in a range from about $1\times10^{-9}$ M to about 1 M and the amount of the at least one dicarboxylic acid and/or a salt thereof in the composition is in a range from about $1\times10^{x9}$ M to about 1 M.

3. The composition of claim 1, wherein the dicarboxylic acid is heptanedioic acid, octanedioic acid, nonanedioic acid, decanedioic acid, undecanedioic acid, dodecanedioic acid, tridecanedioic acid, hexadecanedioic acid tetradecanedioic acid, and/or pentadecanedioic acid, and/or a salt thereof, or any combination thereof.

4. A method for increasing tolerance to abiotic stress and/or for reducing the consequence of abiotic stress in a plant and/or part thereof, comprising contacting a plant and/or part thereof with the composition of claim 1, thereby increasing tolerance to abiotic stress and/or reducing the consequence of abiotic stress in a plant and/or part thereof as compared to a control.

5. The method of claim 4, wherein the at least one dicarboxylic acid is heptanedioic acid, octanedioic acid, nonanedioic acid, decanedioic acid, undecanedioic acid, dodecanedioic acid, tridecanedioic acid, hexadecanedioic acid, tetradecanedioic acid, and/or pentadecanedioic acid, and/or a salt thereof, or any combination thereof.

6. The method of claim 4, wherein the dicarboxylic acid is octanedioic acid, nonanedioic acid, decanedioic acid, and/or undecanedioic acid, and/or a salt thereof, or any combination thereof.

7. The method of claim 4, wherein the amount of aminoguanidine, and/or a salt thereof, is in a range from about $1\times10^{-9}$ M to about 1 M.

8. The method of claim 4, wherein the amount of the at least one dicarboxylic acid is in a range from about $1\times10^{-9}$ M to about 1 M.

9. The method of claim 4, wherein contacting comprises administering the composition to an area comprising the plant and/or part thereof, wherein the rate of administration (application) of the aminoguanidine is in a range from about to 1 μg per hectare (Ha) to about 1 kg/Ha and the rate of administration of the at least one dicarboxylic acid is in a range from about 10 μg/Ha to about 1 kg/Ha.

10. The method of claim 4, wherein the composition further comprises an agriculturally acceptable carrier, support, filler, dispersant, emulsifier, wetter, adjuvant, solubilizer, colorant, tackifier, binder, anti-foaming agent and/or surfactant.

11. The method of claim 4, wherein the composition further comprises one or more additional active components.

12. The method of claim 4, further comprising contacting the plant and/or part thereof with one or more additional active components.

13. The method of claim 12, wherein the additional active components is furanocoumarin, terpene, tripene, pinene, 2-carene, phellandrene, rosmarinic acid, benzyl acetate, or any combination thereof.

14. The method of claim 12, wherein the one or more additional active component is a plant hormone, a growth regulator, an auxin transport inhibitor, an amino acid, a fertilizer, a nutrient, a micronutrient, a terpene, a pesticide, a fungicide, a nematicide, a reflective material, or any combination thereof.

15. The method of claim 14, wherein the plant hormone is auxin, cytokinin, abscisic acid, gibberellin, ethylene, salicylic acid, brassinosteriod (e.g., brassinolide), or any combination thereof, and/or the growth regulator is napthelene acetic acid (NAA) and/or indole-3-butyric acid.

16. The method of claim 14, wherein the amino acid is glycine betaine, aminobutyric acid, or any combination thereof.

17. The method of claim 14, wherein the reflective material is kaolin.

18. The method of claim 4, wherein the plant and/or part thereof are contacted one or more times with the composition.

19. The method of claim 18, wherein the plant and/or part thereof is contacted at least twice with the composition.

20. The method of claim 4, wherein the abiotic stress is cold temperature, freezing, chilling, heat or high temperature, drought, salinity, high light intensity, and/or ozone.

21. The method of claim 4, wherein the abiotic stress is a combination of high temperature and high light intensity; high temperature, high light intensity and drought;
high temperature and drought; high light intensity and drought; and/or cold temperature or chilling and high light intensity.

22. The method of claim 4, wherein the consequence of abiotic stress is sunburn damage, flower-abortion, fruit drop, reduced fruit size, reduced cell division, reduced yield, reduced quality of produce due to appearance and texture, or any combination thereof.

23. The method of claim 4, wherein abiotic stress is a combination of high temperature and high light intensity and the consequence of the abiotic stress is sunburn damage.

24. The method of claim 4, wherein the step of contacting comprises spraying, dusting, sprinkling, scattering, misting, atomizing, broadcasting, soaking, soil injection, soil incorporation, pouring, coating, side dressing, seed treatment, soil treatment, and any combination thereof.

\* \* \* \* \*

UNITED STATES PATENT AND TRADEMARK OFFICE
CERTIFICATE OF CORRECTION

PATENT NO. : 11,638,401 B2
APPLICATION NO. : 16/967015
DATED : May 2, 2023
INVENTOR(S) : Charles Christian Kupatt It is certified that error appears in the above-identified patent and that said Letters Patent is hereby corrected as shown below:

In the Specification

Column 3, Line 42: Please correct "+10%, +5%," to read --±10%, ±5%,--

Column 3, Line 46: Please correct "+10%," to read --±10%,--

Column 3, Line 46: Please correct "even 0.1%" to read --even ±0.1%--

Column 16, Line 48: Please correct "$1\times10^4$ M" to read --$1\times10^{-4}$ M--

Column 16, Line 52: Please correct "$5\times10^4$ M" to read --$5\times10^{-4}$ M--

Column 16, Line 54: Please correct "$1\times10^4$ M" to read --$1\times10^{-4}$ M--

Column 17, Line 53: Please correct "$1\times10^{-1}$ M" to read --$1\times10^{-1}$ M--

Column 20, Line 3: Please correct "500 Hz" to read --500 µg--

Column 24, Line 35: Please insert a paragraph break between "techniques." and "The compositions"

Column 27, Lines 54-55: Please remove the paragraph break between "dependent." and "The third"

In the Claims

Column 33, Line 57, Claim 2: Please correct "$1\times10^{x9}$M" to read --$1\times10^{-9}$M--

Signed and Sealed this
Eleventh Day of July, 2023

Katherine Kelly Vidal
*Director of the United States Patent and Trademark Office*